United States Patent
Gin et al.

(10) Patent No.: US 9,687,840 B2
(45) Date of Patent: Jun. 27, 2017

(54) COMPOSITES COMPRISING NOVEL RTIL-BASED POLYMERS, AND METHODS OF MAKING AND USING SAME

(71) Applicant: THE REGENTS OF THE UNIVERSITY OF COLORADO, A BODY CORPORATE, Denver, CO (US)

(72) Inventors: Douglas Gin, Longmont, CO (US); Trevor Carlisle, Boulder, CO (US); Richard Noble, Boulder, CO (US); Garret Nicodemus, Broomfield, CO (US); William McDanel, Boulder, CO (US); Matthew Cowan, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 93 days.

(21) Appl. No.: 14/413,772

(22) PCT Filed: Jul. 9, 2013

(86) PCT No.: PCT/US2013/049765
§ 371 (c)(1),
(2) Date: Jan. 9, 2015

(87) PCT Pub. No.: WO2014/011661
PCT Pub. Date: Jan. 16, 2014

(65) Prior Publication Data
US 2015/0209776 A1    Jul. 30, 2015

Related U.S. Application Data

(60) Provisional application No. 61/669,303, filed on Jul. 9, 2012, provisional application No. 61/826,154, filed on May 22, 2013.

(51) Int. Cl.
*B01D 53/22* (2006.01)
*B01J 39/18* (2017.01)
(Continued)

(52) U.S. Cl.
CPC .......... *B01J 39/185* (2013.01); *B01D 53/228* (2013.01); *B01D 67/0013* (2013.01);
(Continued)

(58) Field of Classification Search
CPC ................ B01D 39/185; B01D 53/228; B01D 2053/221; B01D 67/0013; B01D 69/12;
(Continued)

(56) References Cited

U.S. PATENT DOCUMENTS

2009/0266230 A1   10/2009   Radosz et al.
2009/0291874 A1*  11/2009   Bara ................. B01D 53/1493
                                                         510/175

(Continued)

FOREIGN PATENT DOCUMENTS

WO    WO 2011/046661 A1 *  4/2011  ............. B01D 53/22
WO    WO2011046661 A1      4/2011

OTHER PUBLICATIONS

International Search Report dated Feb. 26, 2014 for PCT International Application No. PCT/US2013/049765.
(Continued)

*Primary Examiner* — Jason M Greene
(74) *Attorney, Agent, or Firm* — Saul Ewing LLP; Kathryn Doyle; Domingos J. Silva

(57) ABSTRACT

The invention includes compositions comprising curable imidazolium-functionalized poly(room-temperature ionic liquid) copolymers and homopolymers. The invention further includes methods of preparing and using the compositions of the invention. The invention further includes novel methods of preparing thin, supported, room-temperature
(Continued)

ionic liquid-containing polymeric films on a porous support. In certain embodiments, the methods of the invention avoid the use of a gutter layer, which greatly reduces the overall gas permeance and selectivity of the composite membrane. In other embodiments, the films of the invention have increased gas selectivity and permeance over films prepared using methods described in the prior art.

18 Claims, 16 Drawing Sheets

(51) Int. Cl.

| | | |
|---|---|---|
| *B01D 67/00* | (2006.01) | |
| *B01D 71/64* | (2006.01) | |
| *B01D 71/34* | (2006.01) | |
| *B01J 41/08* | (2017.01) | |
| *B01D 69/12* | (2006.01) | |
| *C08G 59/26* | (2006.01) | |
| *C08G 59/50* | (2006.01) | |
| *C08F 12/26* | (2006.01) | |
| *C08F 12/32* | (2006.01) | |
| *C08F 112/14* | (2006.01) | |
| *C08F 112/32* | (2006.01) | |
| *C08F 8/30* | (2006.01) | |
| *B01J 39/19* | (2017.01) | |
| *B01J 41/09* | (2017.01) | |

(52) U.S. Cl.
CPC ............. *B01D 69/12* (2013.01); *B01D 71/34* (2013.01); *B01D 71/64* (2013.01); *B01J 39/19* (2017.01); *B01J 41/09* (2017.01); *C08F 8/30* (2013.01); *C08F 12/26* (2013.01); *C08F 12/32* (2013.01); *C08F 112/14* (2013.01); *C08F 112/32* (2013.01); *C08G 59/26* (2013.01); *C08G 59/5006* (2013.01); *B01D 2053/221* (2013.01); *B01D 2323/46* (2013.01)

(58) Field of Classification Search
CPC .... B01D 71/34; B01D 71/64; B01D 2323/46; C08F 12/26; C08F 12/32; C08F 112/14; C08F 112/32; C08G 59/26; C08G 59/5006; B01J 41/085
See application file for complete search history.

(56) References Cited

U.S. PATENT DOCUMENTS

2011/0236295 A1    9/2011  Anderson et al.
2011/0306702 A1*  12/2011  Klopsch ................ C08G 59/00
                                                          523/400

OTHER PUBLICATIONS

Noble, R.D. et al., "Ionic Liquids as Novel Materials for Energy Efficient CO2 Separations," Sustainable Technologies, Systems and Policies, 2012, Carbon Capture and Storage Workshop, pp. 1-7.

* cited by examiner wherein W is the side chain selected from the group consisting of:

Non-limiting examples wherein W is the side chain selected from the group consisting of:

wherein in (100 × (1-p)) % of the polymerized monomeric units, Z is:

wherein in (100 × p) % of the polymerized monomeric units, Z is selected from the group consisting of H, alkyl, benzyl, phenyl, or oligo(ethylene glycol);

Non-limiting examples

Non-limiting examples

Y = Alkyl, Benzyl, Phenyl, Nitrile, Hydroxide, Oligo(ethylene glycol), Nitro, Halide, or H
X = NTf$_2$, OTf, OAc, OTs, BF$_4$, PF$_6$, N(CN)$_2$, C(CN)$_3$, B(CN)$_4$, or Halide
A = Alkyl or H
R = Alkyl or Oligo(ethylene glycol)
P = 0-1 (a value of 0 corresponds to the structures shown in Fig. 1)
Z = Pendant curable group:

a. vinyl    b. diene    c. styrene    d. acrylate    e. epoxide
                                      A = alkyl or H

COMPOSITES COMPRISING NOVEL RTIL-BASED POLYMERS, AND METHODS OF MAKING AND USING SAME

CROSS-REFERENCE TO RELATED APPLICATIONS

The present application is a 35 U.S.C. §371 national phase application of, and claims priority to, PCT Application No. PCT/US2013/049765, filed Jul. 9, 2013, which claims priority under 35 U.S.C. §119(e) to U.S. Provisional Patent Applications No. 61/669,303, filed Jul. 9, 2012, and No. 61/826,154, filed May 22, 2013, all of which applications are incorporated herein by reference in their entireties.

STATEMENT REGARDING FEDERALLY SPONSORED RESEARCH OR DEVELOPMENT

This invention was made with government support under grant number DE-AR0000098 awarded by the U.S. Department of Energy and grant number HDTRA1-08-1-0028 awarded by the DOD/DARPA. The government has certain rights in the invention.

BACKGROUND OF THE INVENTION

Room-temperature ionic liquids (RTILs) are organic salts that are liquid at or below 100° C., and composed entirely of cations and anions (free of additional solvents) (Welton, 1999, Chem. Rev. 99:2071-2083; Welton, 2004, Coord. Chem. Rev. 248:2459-2477). They are useful as solvents and liquid media due to their unique properties: very low volatility, relatively low viscosity, high thermal stability, low flammability, high ionic conductivity, tunable polar solvation and transport properties, and in some cases, even catalytic properties. These characteristics have made RTILs excellent candidates as a more environmentally benign class of solvents to replace conventional organic solvents in chemical, electrochemical, and physical extraction/separation processes. In addition, RTILs are useful as novel gas separation media in supported liquid membranes (SLMs) and novel catalysts in chemical processes (Scovazzo et al., "Supported Ionic Liquid Membranes and Facilitated Ionic Liquid Membranes," ACS Symposium Series 818 (Ionic Liquids), 2002, 69-87; Schaefer et al., "Opportunities for Membrane Separation Processes using Ionic Liquids," ACS Symposium Series 902 (Ionic Liquids IIIB: Fundamentals, Progress, Challenges, and Opportunities), 2005, 97-110; Riisager & Fehrmann, Ionic Liquids in Synthesis (2$^{nd}$ ed.), Wiley-VCH: Weinheim, Germany, 2007; 527-558; Scovazzo et al., 2004, J. Mem. Sci. 238:57-63; Jiang et al., 2007, J. Phys. Chem. B. 111:5058-5061). Research in recent years of RTILs as selective gas separation media has focused on $CO_2$-based separations, with $SO_2$ removal also appearing to be a promising pursuit (Jiang et al., 2007, Phys. Chem. B 111:5058; Huang et al., 2006, Chem. Commun. 38:4027; Anderson et al., 2006, J. Phys. Chem. B 110:15059).

Effective and economical removal of $CO_2$ from process streams containing other light gases, such as $N_2$, $CH_4$, or $H_2$, is of vital importance and represents an ongoing chemical engineering challenge ("Basic Research Needs for Geosciences: Facilitating 21st Century Energy Systems," Office of Basic Energy Sciences of the U.S. Dept. of Energy, 2007; Jones & Maginn, 2010, ChemSusChem 3:863-864; Descamps et al., 2008, Energy 33:874-881; Sridhar et al., 2007, Sep. Purif. Rev. 36:113-174; Review of emerging resources: U.S. Shale gas and shale plays, 2011; available from: http://www dot eia dot gov). Specifically, the separation of $CO_2$ from $N_2$, from $CH_4$, and from $H_2$ are three distinct separation challenges faced by the electrical energy, natural gas, and syngas production sectors, respectively. In the production of electrical energy, potential climate change issues attributed to anthropogenic $CO_2$ have recently highlighted the importance of $CO_2$ separation from flue gas (i.e., $CO_2/N_2$ separation) ("Basic Research Needs for Geosciences: Facilitating 21st Century Energy Systems," Office of Basic Energy Sciences of the U.S. Dept. of Energy, 2007; Jones & Maginn, 2010, ChemSusChem 3:863-864; Bara et al., 2010, Acc. Chem. Res. 43:152-159). This separation will become more important as world population expands and coal- and natural gas-fired electric power plants are increasingly utilized as sources of cheap electricity. In the natural gas industry, "sweetening" (i.e., $CO_2/CH_4$ separation) is a crucial process needed to obtain $CH_4$ from natural gas wells with a degree of purity acceptable for piping, transport, and combustion (Sridhar et al., 2007, Sep. Purif. Rev. 36:113-174; Review of emerging resources: U.S. Shale gas and shale plays, 2011; available from: http://www dot eia dot gov). $CH_4$ is also an incredibly important feedstock for the production of $H_2$ via steam methane reforming (SMR) and the water gas shift (WGS) reaction (Descamps et al., 2008, Energy 33:874-881; Kohl & Nielsen, Gas Purification, 5$^{th}$ ed., Gulf Publishing Company, Houston, Tex., 1997; Barelli et al., 2008, Energy 33:554-570). The production of $H_2$ in this manner is vital for the synthesis of chemicals such as $NH_3$ and urea, as well as for clean energy applications (i.e., $H_2$ fuel cells or combustion). Since $CO_2$ is produced as an impurity in the SMR-WGS process, it must be separated and removed from the desired $H_2$ product to generate sufficiently low levels for efficient $H_2$ production (Descamps et al., 2008, Energy 33:874-881; Barelli et al., 2008, Energy 33:554-570). Ideally, the $CO_2$ should be removed while leaving the $H_2$ at high pressure and ready for transport or combustion. The development of separation technologies that can effectively and economically remove $CO_2$ from these light gases is imperative for meeting the increasing regulations placed on $CO_2$ emissions.

Polymer membrane-based gas separations have the potential to overcome many of the disadvantages associated with traditional $CO_2$ separation technologies. Membrane processes have the advantages of scalability, small plant footprint, and ease of operation. However, in order for polymer membranes to be competitive with traditional separation methods they must possess both high $CO_2$ flux and high $CO_2$ selectivity (Zolandz & Fleming, Membrane Handbook, Chapman & Hall, New York, N.Y., 1992; Baker, Membrane Technology and Applications, 2$^{nd}$ ed., John Wiley & Sons Ltd., West Sussex, England, 2004). The range of polymer materials and separation performances for $H_2/CO_2$, $CO_2/CH_4$ and $CO_2/N_2$ separations are considerably large (Robeson, 2008, J. Mem. Sci. 320:390-400). Most polycondensation polymers, such as polycarbonates and polyimides, have been exhaustively studied for $CO_2/CH_4$ and $CO_2/N_2$ separations (Powell & Qiao, 2006, J. Mem. Sci. 279:1-49). $CO_2$-selective polymer membranes for $CO_2/H_2$ separations (i.e., "reverse-selective") are quite rare due to the typically high diffusion rate of $H_2$ vs. $CO_2$ (Zolandz & Fleming, Membrane Handbook, Chapman & Hall, New York, N.Y., 1992; Patel et al., 2003, Adv. Mater. 15:729-733; Lin et al., 2006, Science 311:639-642). Only a few examples of polymeric $CO_2$-selective membranes for $CO_2/H_2$ separations exist in the literature, and include polyethylene glycol) (PEG) and its copolymers (Patel et al., 2003, Adv. Mater. 15:729-733; Lin et al., 2006, Science 311:639-642), which have exceptional $CO_2$/light gas selectivities and $CO_2$ permeabilities (Lin et al., 2005, Macromolecules 38:8381-8393; Lin et al., 2006, Adv. Mater. 18:39-44).

RTILs have been proposed as alternative "green" solvents to replace the volatile organic compounds (VOCs) typically employed in $CO_2$ scrubbing (Baltus et al., 2005, Sep. Sci. Technol. 40:525; Anthony et al., 2005, Int. J. Environ. Technol. Manage. 4:105). RTILs can selectively permeate one gas over another (for example, $CO_2/CH_4$, $CO_2/N_2$, and $CO_2/H_2$; Rogers & Seddon, "Ionic liquids: Industrial applications for green chemistry," Proceedings of the American Chemical Society meeting 2002, Washington, D.C.: American Chemical Society; Maase, "Industrial applications of ionic liquids," in "Ionic liquids in synthesis," 2008, Wiley-VCH Verlag GmbH & Co. KGaA. p. 663-687; Wilkes et al., "Introduction," in "Ionic liquids in synthesis," 2008, Wiley-VCH Verlag GmbH & Co. KGaA. p. 1-6), or separate products from a reaction mixture such as during a transesterification reaction (Hernandez-Fernandez et al., 2007, J. Mem. Sci. 293:73-80). Imidazolium-based RTILs are particularly attractive because of their distinctly superior $CO_2$ solubility and separation properties compared to most other RTILs (Cadena et al., 2004, J. Am. Chem. Soc. 126:5300-5308; Scovazzo et al., 2004, J. Mem. Sci. 238:57-63; Bara et al., 2007, Ind. Eng. Chem. Res. 46:5380-5386).

Favorable $CO_2$ solubility selectivity combined with "non-volatility" has led many researchers to investigate the performance of RTILs in a membrane configuration known as a supported ionic liquid membrane (SILM) (Scovazzo et al., 2004, J. Mem. Sci. 238:57-63; Morgan et al., 2005, Ind. Eng. Chem. Res. 44:4815-4823; Bara et al., 2009, Ind. Eng. Chem. Res. 48:2739-2751; Scovazzo, 2009, J. Mem. Sci. 343:199-211; Riisagera et al., 2006, Top. Catal. 40:91-102; Hanioka et al., 2008, J. Mem. Sci. 314:1-4; Myers et al., 2008, J. Mem. Sci. 322:28-31). Fabrication of a SILM is accomplished by saturating a non-selective, highly porous polymer support (e.g., poly(ether sulfone)) with a RTIL. Capillary forces alone are predominantly responsible for retention of the liquid RTIL component within the support. Employment of SILMs is attractive as RTILs possess negligible vapor pressures and can be impregnated into porous supports without evaporative losses—a hindrance for traditional supported liquid membranes (SLMs). For examples, imidazolium-based RTILs have been used in SILMs (Camper et al., 2006, Ind. Eng. Chern. Res. 45:6279-6283; Riisagera et al., 2006, Top. Catal. 40:91-102; Scovazzo, 2009, J. Mem. Sci. 343:199-211; Bara et al., 2009, Ind. Eng. Chem. Res. 48:2739-2751.). However, regardless of the nature of the liquid in the support (RTILs or others), the SLM configuration can fail if the pressure differential across the membrane is great enough to overcome capillary forces and push the liquid through the pores of the support. "Blow out" of the fluid RTIL component typically occurs at ≥1 atm of pressure drop. Various industrial gas separations occur at much higher pressures than SLMs can withstand, typically only a few atmospheres (Baker, 2002, Ind. Eng. Chem. Res. 41:1393-1411). Further, the thickness of the active RTIL separation layer in SILMs is limited to the porous polymer support thickness, which is typically 35-45 µm thick at minimum. For high filtration throughput in membranes, thinner active separation layers (≤1 µm thick) are desired because they have much greater permeate fluxes. Due to these limitations, SILMs are not at this time a widely viable technology for industrial membrane separations (Ferguson et al., 2007, Ind. Eng. Chem. Res. 46:1369-1374).

Solid-liquid composite materials formed from poly(RTIL)s and RTILs were developed (Bara et al., 2008, Ind. Eng. Chem. Res. 47:9919-9924; Bara et al., 2008, Polym. Adv. Technol. 19:1415-1420; Bara et al., 2009, Ind. Eng. Chem. Res. 48:4607-4610; Carlisle et al., 2010, J. Mem. Sci. 359:37-43; Carlisle et al., 2013, Ind. Eng. Chem. Res., 52; 1023-1032). These composite films contained 20 wt % RTIL and had enhanced liquid stability and superior $CO_2$ separation characteristics compared to neat solid poly(RTIL) films. Further, $CO_2$ permeability was improved by incorporating 45-75 wt % free RTIL in a cross-linked poly(RTIL) matrix (Carlisle et al., 2012, J. Mem. Sci. 397-398:24-37).

Very limited examples of step-growth imidazolium-based RTIL monomers and polymers have been described in the literature (Matsumi et al., 2006, Macromolecules 39:6924; Lee et al., 2011, Adv. Funct. Mater. 21:708; Carlisle et al., 2010, J. Membr. Sci. 359:37; Erdmenger et al., 2010, J. Mater. Chem. 20:3583; Williams et al., 2010, Polymer 51:1252; Amarasekara et al., 2012, Polymer Bull. 68:901). For example, imidazolium bis(epoxide) monomers and their polymers and cross-linked resins formed with amine monomers were reported (Demberelnyamba et al., 2004, Chem. Lett. 33:560; Paley et al., U.S. Pat. Appl. No. US 2010/0004389 A1; Libb et al., PCT Pat. Appl. No. WO 2010/002438 A1). The published methods for preparing imidazolium bis(epoxide) step-growth monomers from imidazole and highly reactive epichlorohydrin are either experimentally complex or do not generate pure and isolatable monomer (Paley et al., U.S. Pat. Appl. No. US 2010/0004389 A1; Libb et al., PCT Pat. Appl. No. WO 2010/002438 A1). In fact, the published reports fail to provide any characterization data on imidazolium bis(epoxide) monomers (Paley et al., U.S. Pat. Appl. No. US 2010/0004389 A1; Libb et al., PCT Pat. Appl. No. WO 2010/002438 A1), which is consistent with the fact that the monomers were never isolated and characterized.

Preparing a RTIL-containing thin film on the surface of a porous substrate is not trivial. RTILs have low molecular weights (i.e., they are very small compared to typical pore diameters) and are liquid at temperatures below 100° C. Consequently, RTILs diffuse much more readily into a porous substrate compared to a large polymeric molecule. It follows that, if a composition comprising a polymer and a RTIL is applied to the surface of a porous material, the RTIL penetrates the underlying porous material at a much higher rate than the polymeric molecule. Consequently, the film remaining on the surface of the porous substrate is depleted of or even free of RTIL, resulting in poor gaseous permeation characteristics (e.g., low permeance and/or low selectivity). An alternative method includes pre-coating the porous support with a "gutter layer." A gutter layer is a film of dense polymer with high permeability and low selectivity. The gutter layer acts as a barrier to the penetration of the into the porous substrate. However, use of a gutter layer greatly reduces the overall gas permeance and selectivity of the composite membrane (i.e., reduces composite membrane performance)

There is a need for novel materials that may be used for selective membrane-based gaseous separations. Such materials should be easily and economically prepared, and should allow for the efficient separation of gaseous components from industrial gases in a timely fashion. There is also a need for novel methods of preparing thin, dense films composed of polymer and RTIL with improved gas permeability and selectivity. Such methods should allow for economical and efficient coating of a porous substrate, and the resulting composite membrane may be used for the efficient separation of gaseous components from industrial gases. The present invention addresses these needs.

BRIEF SUMMARY OF THE INVENTION

The invention includes a composition comprising a curable, imidazolium-functionalized poly(room-temperature ionic liquid) (poly(RTIL)) copolymer, wherein the copolymer comprises a plurality of imidazolium-functionalized monomeric units, wherein (100λ(1−p))% of the monomeric units comprise a side-chain imidazolium group substituted with a curable group, further wherein (100×p) % of the monomeric units comprise a side-chain imidazolium group substituted with a non-curable group, wherein p ranges from 0 to 1.

In one embodiment, the copolymer has the formula (I),

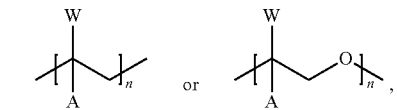

wherein in (I): A is H, alkyl or substituted alkyl; W is the side chain selected from the group consisting of:

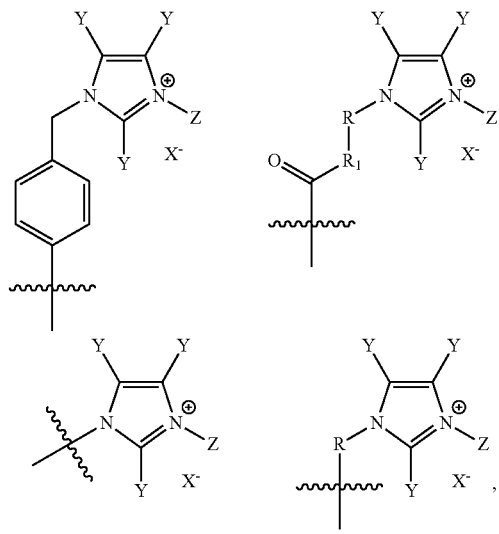

wherein in (II): R is $C_1$-$C_6$ alkylene, $C_2$-$C_6$ alkenylene or $C_2$-$C_6$ alkynylene, wherein R is optionally substituted; $R_1$ is NH or O; each occurrence of Y is independently selected from the group consisting of H, alkyl, benzyl, phenyl, hydroxyl, nitro, halo, —$(CH_2CH_2O)_m$A and —$O(CH_2CH_2O)_m$A, wherein m is an integer ranging from 1 to 20, wherein each Y is independently optionally substituted; $X^-$ is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, sulfonate, and any combinations thereof; in (100×(1−p)) % of the monomeric units, Z is the curable group selected from the group comprising vinyl, 1,3-butadienyl, (1,3-butadienyl)-($C_1$-$C_6$ alkylene), styrenyl, $CH_2$=C(A)C(=O)R; (oxiran-2-yl)-R; and any combinations thereof; in (100×p) % of the monomeric units, Z is the non-curable group selected from the group consisting of H, alkyl, benzyl, phenyl, and oligo(ethylene glycol); and n ranges from 2 to 100,000.

In one embodiment, p is 0. In another embodiment, p ranges from about 0 to about 0.8. In yet another embodiment, p ranges from about 0 to about 0.5. In yet another embodiment, p ranges from about 0 to about 0.2.

In one embodiment, formula (I) is:

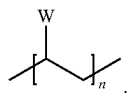

In another embodiment, formula (II) is:

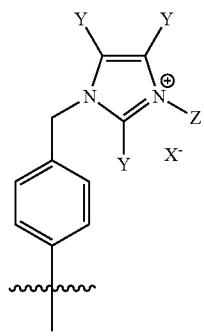

In one embodiment, each occurrence of Y is H. In another embodiment, the curable group Z comprises vinyl. In yet another embodiment, the composition is at least partially cured. In yet another embodiment, the composition further comprises an imidazolium-functionalized RTIL. In yet another embodiment, at least 50 wt % of the RTIL-containing material in the composition corresponds to the imidazolium-functionalized RTIL. In yet another embodiment, the composition further comprises a polymerization initiator. In yet another embodiment, the composition further comprises an imidazolium-based RTIL monomer. In yet another embodiment, the composition is embedded within a porous support membrane or deposited as a layer on the surface of a porous support membrane. In yet another embodiment, the membrane has a thickness of less than about 500 nanometers. In yet another embodiment, the membrane has a thickness of less than about 200 nanometers. In yet another embodiment, the composition is at least partially cured after being embedded within the porous support membrane or deposited as a layer on the surface of the porous support membrane.

The invention further includes a method of preparing a curable poly(RTIL). The method comprises providing a polymer comprising a plurality of monomeric units comprising a side-chain functional group capable of undergoing nucleophilic displacement or addition. The method further comprises reacting the polymer with a reagent selected from the group consisting of: (a) an imidazole derivative comprising a curable group at the 3-position of the imidazole ring; (b) a mixture comprising an imidazole derivative comprising a curable group at the 3-position of the imidazole ring and an imidazole derivative comprising a non-curable group at the 3-position of the imidazole ring; (c) when the polymer comprises a N—H-imidazolyl group, a reagent comprising a functional group capable of undergoing nucleophilic displacement or addition and a curable group, whereby the functional group capable of undergoing nucleophilic displacement or addition reacts with the N—H-imidazolyl group; and (d) when the polymer comprises a N—H-imidazolyl group, a mixture comprising (i) a reagent comprising a functional group capable of undergoing nucleophilic displacement or addition and a curable group, and (ii) a reagent comprising a functional group capable of undergoing nucleophilic displacement or addition and a non-curable group, whereby the functional group capable of undergoing nucleophilic displacement or addition reacts with the N—H-imidazolyl group thereby generating the curable poly(RTIL). The method further comprises optionally exchanging the counteranion of the curable poly(RTIL) for an anion of choice.

In one embodiment, the polymer comprises poly(4-halomethylstyrene). In another embodiment, the imidazole derivative comprising a curable group at the 3-position of the imidazole ring comprises N-vinylimidazole.

The invention further includes a method of processing a given gas mixture comprising a first gas component and a second gas component. The method comprises providing a membrane or film comprising a composition of the invention, wherein the composition is at least partially cured, further wherein the membrane or film comprises a feed side and a permeate side, further wherein the membrane or film is selectively permeable to the first gas component over the second gas component. The method further comprises contacting the given gas mixture with the feed side of the membrane or film; and applying a pressure difference across the membrane or film; whereby the gas mixture isolated at the permeate side of the membrane or film is enriched for the first gas component over the second gas component as compared to the given gas mixture.

In one embodiment, the first gas component comprises carbon dioxide ($CO_2$) and the second gas component comprises methane ($CH_4$), hydrogen ($H_2$), or nitrogen gas ($N_2$). In another embodiment, providing the membrane or film comprises embedding the composition within the pores of a solid porous support. In yet another embodiment, the membrane or film has a thickness of less than about 500 nanometers. In yet another embodiment, the membrane or film forms a layer on the surface of a solid porous support. In yet another embodiment, the thickness of the layer is less than about 10 microns.

The invention further includes a composition comprising a RTIL, a step-growth imidazolium-based RTIL monomer and an amine-containing monomer.

In one embodiment, the step-growth imidazolium-based RTIL monomer comprises the compound of formula (IV):

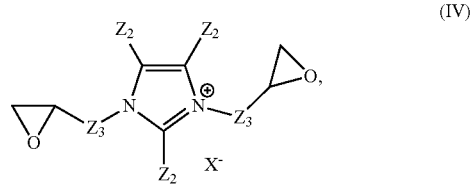

(IV)

wherein $X^-$ is an anion; each occurrence of $Z_3$ is independently $C_1$-$C_{20}$ alkylene, wherein one or more methylene groups are optionally replaced with —O—; and each occurrence of $Z_2$ is independently selected from the group consisting of H, alkyl, alkenyl, alkynyl, and aryl groups having 1 to 20 carbon atoms.

In one embodiment, the composition is at least partially cured, whereby at least a portion of the step-growth imidazolium-based RTIL monomer reacts with the amine-containing monomer. In another embodiment, the composition comprises about 75 wt % or less of the RTIL. In yet another embodiment, the composition is embedded within a porous support membrane or deposited as a layer on the surface of a porous support membrane. In yet another embodiment, the composition is at least partially cured after being embedded within the porous support membrane or deposited as a layer on the surface of the porous support membrane.

The invention further includes a composition comprising a porous support, wherein at least a portion of the surface of the porous support is coated with a thin, supported, room-temperature ionic liquid (RTIL)-containing polymeric film, further wherein a RTIL is dispersed in at least a portion of the pores of the solid support.

The invention further includes a composition comprising a thin, supported, room-temperature ionic liquid (RTIL)-containing polymeric film on a porous support, wherein the film is prepared by a method comprising the steps of: contacting at least a portion of the surface of the solid support with a first composition comprising a RTIL and a polymer, thereby generating a first film on the solid support; and, contacting the first film with a second composition comprising a RTIL, thereby generating the thin, supported RTIL-containing polymeric film.

The invention further includes a composition comprising a thin, supported, room-temperature ionic liquid (RTIL)-containing polymeric film on a porous support, wherein the film is prepared by a method comprising the steps of: contacting at least a portion of the surface of a solid support with a first composition comprising a polymer, thereby generating a first polymeric film on the solid support; contacting the first polymeric film with a second composition comprising a RTIL; and, swelling the first polymeric film and gelling the RTIL in the swollen polymeric film, thereby generating a thin, supported, RTIL-containing polymeric film on the porous support.

The invention includes a method of preparing a thin, supported, room-temperature ionic liquid (RTIL)-containing polymeric film on a porous support. The method comprises contacting at least a portion of the surface of a solid support with a first composition comprising a RTIL and a polymer, thereby generating a first film on the solid support. The method further comprises contacting the first film with a second composition comprising a RTIL, thereby generating the thin, supported RTIL-containing polymeric film.

In one embodiment, the second composition is cast or sprayed on the first film. In another embodiment, the first film is dipped in the second composition. In yet another embodiment, the second solution consists essentially of a RTIL. In yet another embodiment, the second solution comprises an RTIL and a polymer. In yet another embodiment, the polymer comprises a curable poly(RTIL). In yet another embodiment, the RTIL-to-polymer ratio ranges from about 99.9-0.1 to about 5-95. In yet another embodiment, the thin, supported RTIL-containing polymeric film has improved $CO_2$ permeability as compared to the first film.

The invention further includes a method of preparing a thin, supported, room-temperature ionic liquid (RTIL)-containing polymeric film on a porous support. The method comprises contacting at least a portion of the surface of a solid support with a first composition comprising a polymer, thereby generating a first polymeric film on the solid support. The method further comprises contacting the first polymeric film with a second composition comprising a RTIL. The method further comprises swelling the first polymeric film and gelling the RTIL in the swollen polymeric film, thereby generating a thin, supported RTIL-containing polymeric film on the porous support.

In one embodiment, the polymer is ionic or neutral. In another embodiment, the first composition is essentially free of a RTIL. In yet another embodiment, the second composition is cast or sprayed on the first film. In yet another embodiment, the first film is dipped in the second composition. In yet another embodiment, the second solution consists essentially of a RTIL. In yet another embodiment, the second solution comprises an RTIL and a polymer. In yet another embodiment, the polymer comprises a curable poly (RTIL). In yet another embodiment, the RTIL-to-polymer ratio ranges from about 99.9-0.1 to about 5-95. In yet another embodiment, the RTIL is gelled into the polymeric film using a physical or chemical method. In yet another embodiment, the gelation is induced using UV light or heat. In yet another embodiment, swelling of the polymeric film is enhanced using heat or a solvent.

BRIEF DESCRIPTION OF THE DRAWINGS

The following detailed description of preferred embodiments of the invention is better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

DETAILED DESCRIPTION OF THE INVENTION

Figure 1:
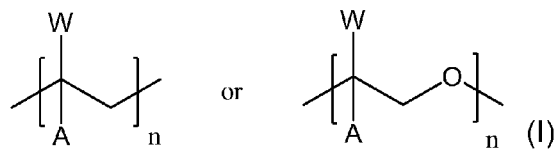
FIG. 1 is a non-limiting illustration of curable poly(RTIL) homopolymers useful within the invention. Curable Poly (RTIL)s 1-4 are based on imidazolium-functionalized poly (styrene), poly(acrylate), poly(ethylene) and poly(ethylene oxide) polymers, respectively. A is H, alkyl or substituted alkyl. W is the side chain, which is the same for all monomeric units. R is $C_1$-$C_6$ alkylene, $C_2$-$C_6$ alkenylene or $C_2$-$C_6$ alkynylene, wherein R is optionally substituted. $R_1$ is NH or O. Each occurrence of Y is independently selected from the group consisting of H, alkyl, benzyl, phenyl, hydroxy, nitro, halo, —$(CH_2CH_2O)_m$A and —$O(CH_2CH_2O)_m$A, wherein m is an integer ranging from 1 to 20, further wherein each Y is optionally independently substituted. X is a counteranion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, alkyl or aryl sulfonate (such as mesylate or tosylate), and any combinations thereof n ranges from 2 to 100,000.
Figure 1:
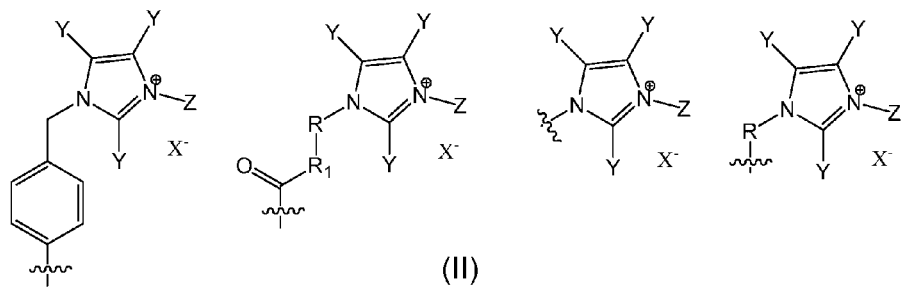
Figure 1:
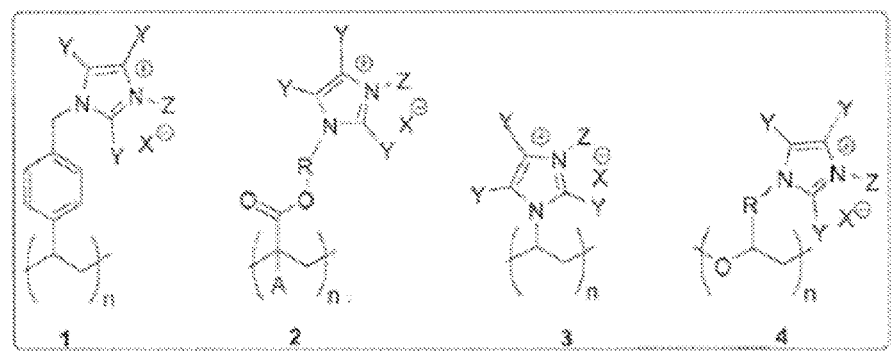
Figure 1:
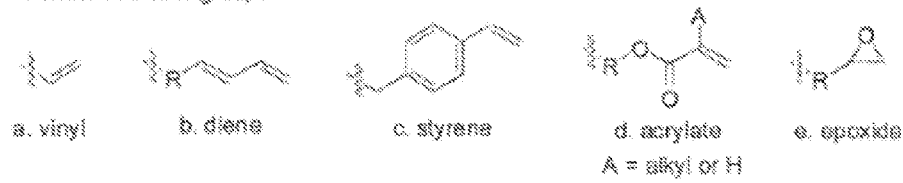

The present invention relates to the unexpected discovery of curable charged imidazolium-functionalized polymers, and compositions comprising these polymers and room-temperature ionic liquids (RTILs). The invention further relates to the use of these compositions in cross-linked, dense, thin membrane form for selective $CO_2$/light gas separations.

In one aspect, the present invention includes novel methods of preparing imidazolium-functionalized polymers with pendant polymerizable groups (herein referred to as "curable poly(RTIL)s"). In another aspect, the present invention includes a curable poly(RTIL)-RTIL composition, which comprise at least one curable poly(RTIL) and at least one RTIL. In yet another aspect, the present invention includes a curable poly(RTIL)-RTIL composition, which comprise at least one curable poly(RTIL) and at least one RTIL, wherein the curable poly(RTIL) is cured (i.e., at least partially cross-linked). In yet another aspect, the present invention includes a composition comprising a thin (e.g., <1 μm) curable poly(RTIL)-RTIL film. In one embodiment, such composition affords high gas diffusivity. In another embodiment, such composition is useful as a $CO_2$/light gas separation membrane material, either by itself or supported on a suitable porous support.

The present invention further relates to the unexpected discovery of high-diffusivity poly(RTIL)-RTIL solid-liquid composites wherein the poly(RTIL) is prepared from step-growth imidazolium-based RTIL monomers. Such composites are useful as $CO_2$/light gas separation membrane materials.

In one aspect, the present invention includes novel methods of preparing poly(RTIL)-RTIL solid-liquid composites wherein the poly(RTIL) is prepared from step-growth imidazolium-based RTIL monomers.

The present invention further relates to the unexpected discovery of novel methods of preparing thin, supported polymeric films comprising RTIL. The films prepared using the methods of the invention have superior gas permeance over films prepared using methods described in the prior art. In one embodiment, the films of the invention have increased gas selectivity over films prepared using methods described in the prior art. In another embodiment, the films of the invention have increased $CO_2$ selectivity over films prepared using methods described in the prior art.

DEFINITIONS

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in organic chemistry, inorganic chemistry, polymer science and chemical engineering are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

As used herein, the terms "comprising," "including," "containing," and "characterized by" are exchangeable, inclusive, open-ended and does not exclude additional, unrecited elements or method steps. Any recitation herein of the term "comprising," particularly in a description of components of a composition or in a description of elements of a device, is understood to encompass those compositions and methods consisting essentially of and consisting of the recited components or elements.

As used herein, "consisting of" excludes any element, step, or ingredient not specified in the claim element.

As used herein, "consisting essentially of" does not exclude materials or steps that do not materially affect the basic and novel characteristics of the claim.

As used herein, the term "polymer" refers to a molecule composed of repeating structural units typically connected by covalent chemical bonds. The term "polymer" is also meant to include the terms copolymer and oligomers. In one embodiment, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "polymerization" or "cross-linking" refers to at least one reaction that consumes at least one functional group in a monomeric molecule (or monomer), oligomeric molecule (or oligomer) or polymeric molecule (or polymer), to create at least one covalent linkage between at least two distinct molecules (e.g., intermolecular bond), at least one covalent linkage within the same molecule (e.g., intramolecular bond), or any combinations thereof. A polymerization or cross-linking reaction may consume between about 0% and about 100% of the at least one functional group available in the system. In one embodiment, polymerization or cross-linking of at least one functional group results in about 100% consumption of the at least one functional group. In another embodiment, polymerization or cross-linking of at least one functional group results in less than about 100% consumption of the at least one functional group.

As used herein, the term "curable" as applied to a material refers to a material comprising at least one functional group that may undergo polymerization. The curable material may be non-polymerized (i.e., non-cured material), or may be submitted to polymerization conditions (such as chemical reagents or physical conditions) that induce polymerization of at least a fraction of the at least one polymerizable functional group (i.e., partially or fully cured material). In one embodiment, polymerization or cross-linking of the curable material results in about 100% consumption of the at least one functional group (i.e., fully cured). In another embodiment, polymerization or cross-linking of the curable material results in less than about 100% consumption of the at least one functional group (i.e., partially cured).

As used herein, the term "gutter polymer" is a permeable polymeric material that functions as a channeling and adhesive material between a porous substrate and a layer of another polymer.

As used herein, the term "poly(RTIL)s" refers to polymerized RTILs that comprise RTIL cations attached to a polymer backbone. The polymer backbone may be any suitable polymer backbone known in the art, including but not limited to, polyethylene (i.e., functionalized polyethylene, polyacrylate or polystyrene polymers) or poly(ethylene glycol) backbones. In one embodiment, the poly(RTIL) is curable (i.e., comprises at least one functional group that may undergo polymerization).

As used herein, the term "poly(RTIL)-RTIL" refers to a composite material comprising a polymerized RTIL (poly(RTIL)) and a non-polymerizable RTIL. In one embodiment, the non-polymerizable RTIL cations are not chemically unbound to the polymer chain. In another embodiment, the non-polymerizable RTIL cations are chemically unbound to the polymer chain.

As used herein, the term "step-growth polymer" refers to a polymer that is built up into long chains via step-wise coupling reactions of monomers containing two reactive groups (e.g., A-A), with other monomers containing 2 complementary reactive groups (e.g., B-B). The resulting linear polymers (-(AA-BB)$_n$-) grow geometrically in a step-wise fashion from both ends of the chains and with very different kinetics than chain-addition polymers, which grow rapidly via a chain-addition process from only one end of the polymer chains. Step-growth polymers have distinct chemistries and functional groups on the chain backbones compared to chain-addition polymers as a result of the different monomer reaction processes and chemistries required.

As used herein, "nanoporous" and "nanostructured" refer to a structure having a pore size between about 0.5 nm and about 5 nm in diameter and a "nanofiltration membrane" has an effective pore size between about 0.5 nm and about 5 nm. "Ultraporous" signifies a pore size between about 2.5 nm and about 120 nm and an "ultrafiltration membrane" has an effective pore size between about 2.5 nm and about 120 nm. "Microporous" signifies a pore size between about 45 nm and about 2500 nm and a "microfiltration membrane" has an effective pore size between about 45 nm and about 2500 nm. As used herein, "nanometer scale dimension" refers to pore dimensions between about 0.5 and about 5 nm.

As used herein, a "porous support" refers to a solid body comprising pores of defined range of diameter at least on its surface. In one embodiment, the porous support comprises pores of defined range of diameters throughout the entire support. In another embodiment, the diameter of the pores is less than about 10 microns. In yet another embodiment, the support is microporous or ultraporous. In yet another embodiment, the support has a pore size ranging from 0.005 micron to 10 micron, ranging from 0.01 micron to 0.1 micron, ranging from 0.1 micron to 10 microns, ranging from 0.5 micron to 5 microns, ranging from 0.5 micron to 1 micron, or less than about 0.1 micron. A porous support contemplated within the invention is capable of being coated with a thin polymer film on at least a portion of its surface. Materials suitable for the preparation of a porous support include, but are not limited to, ceramics (such as mullite alumina, silica, zirconia, silicon nitride, and silicon carbide), metals (such as aluminum, silver, and stainless steel), or organic polymers (such as polyethylene, polypropylene, poly(tetrafluoroethylene), polysulfone, polyimide, polyethylene, polyacrylonitrile (PAN), polyacrylonitrile-co-polyacrylate, polyacrylonitrile-co-polymethylacrylate, Nylon-6, 6, poly(vinylidene difluoride), polycarbonate, and any combinations thereof).

As used herein, a "membrane" is a barrier separating two fluids that allows transport between the fluids. In one embodiment, the membrane is a "composite" membrane comprising a composition of the invention combined with a porous support. In one embodiment, the porous membrane is a nanoporous membrane.

As used herein, a "fluid" may be a liquid or a gas. In one embodiment, the fluid is an aqueous liquid. In another embodiment, the fluid is a non-aqueous liquid.

As used herein, the term "electromagnetic radiation" includes radiation of one or more frequencies encompassed within the electromagnetic spectrum. Non-limiting examples of electromagnetic radiation comprise gamma radiation, X-ray radiation, UV radiation, visible radiation, infrared radiation, microwave radiation, radio waves, and electron beam (e-beam) radiation. In one aspect, electromagnetic radiation comprises ultraviolet radiation (wavelength from about 10 nm to about 400 nm), visible radiation (wavelength from about 400 nm to about 750 nm) or infrared radiation (radiation wavelength from about 750 nm to about 300,000 nm). Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In one embodiment, the UV light source emits light between about 350 nm and about 400 nm. In some embodiments, the UV light source emits light between about 400 nm and about 500 nm.

As used herein, the term "Type (I) photoinitiator" refers to a compound that undergoes a unimolecular bond cleavage upon irradiation to yield free radicals. Non-limiting examples of Type (I) photoinitiators are benzoin ethers, benzyl ketals, α-dialkoxyacetophenones, α-hydroxyalkylphenones, α-aminoalkylphenones and acyl-phosphine oxides.

As used herein, the term "Type (II) photoinitiator" refers to a combination of compounds that undergo a bimolecular reaction where the excited state of the photoinitiator interacts with a second molecule (often known as "co-initiator") to generate free radicals.

As used herein, the term "alkyl," by itself or as part of another substituent means, unless otherwise stated, a straight or branched chain hydrocarbon having the number of carbon atoms designated (i.e. $C_1$-$C_6$ means one to six carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is ($C_1$-$C_6$)alkyl, particularly ethyl, methyl, isopropyl, isobutyl, n-pentyl, n-hexyl and cyclopropylmethyl.

As used herein, the term "substituted alkyl" means alkyl as defined above, substituted by one, two or three substituents selected from the group consisting of halogen, —OH, alkoxy, —$NH_2$, —$N(CH_3)_2$, —C(=O)OH, trifluoromethyl, —C≡N—, —C(=O)O($C_1$-$C_4$)alkyl, —C(=O)$NH_2$, —$SO_2NH_2$, —C(=NH)$NH_2$, and —$NO_2$, preferably containing one or two substituents selected from halogen, —OH, alkoxy, —$NH_2$, trifluoromethyl, —$N(CH_3)_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—$CH_2$—$CH_2$—$CH_3$, —$CH_2$—$CH_2$—$CH_2$—OH, —$CH_2$—$CH_2$—NH—$CH_3$, —$CH_2$—S—$CH_2$—$CH_3$, and —$CH_2CH_2$—S(=O)—$CH_3$. Up to two heteroatoms may be consecutive, such as, for example, —$CH_2$—NH—$OCH_3$, or —$CH_2$—$CH_2$—SS—$CH_3$.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are ($C_1$-$C_3$) alkoxy, particularly ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "cycloalkyl" refers to a mono cyclic or polycyclic non-aromatic radical, wherein each of the atoms forming the ring (i.e. skeletal atoms) is a carbon atom. In one embodiment, the cycloalkyl group is saturated or partially unsaturated. In another embodiment, the cycloalkyl group is fused with an aromatic ring. Cycloalkyl groups include groups having from 3 to 10 ring atoms. Illustrative examples of cycloalkyl groups include, but are not limited to, the following moieties:

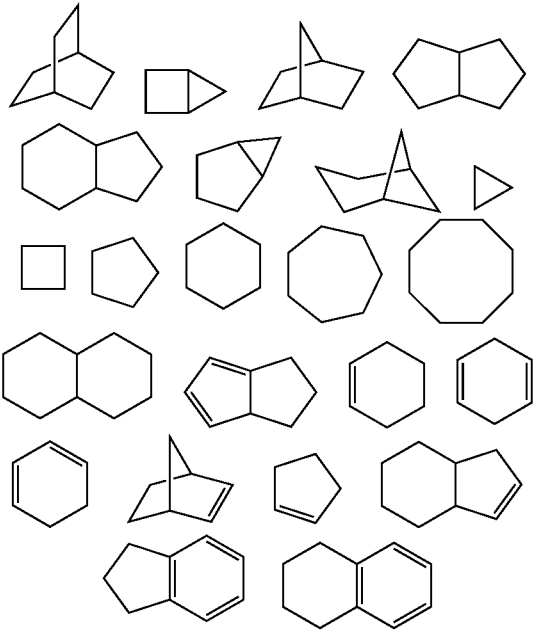

Monocyclic cycloalkyls include, but are not limited to, cyclopropyl, cyclobutyl, cyclopentyl, cyclohexyl, cycloheptyl, and cyclooctyl. Dicyclic cycloalkyls include, but are not limited to, tetrahydronaphthyl, indanyl, and tetrahydropentalene. Polycyclic cycloalkyls include adamantine and norbornane. The term cycloalkyl includes "unsaturated nonaromatic carbocyclyl" or "nonaromatic unsaturated carbocyclyl" groups, both of which refer to a nonaromatic carbocycle as defined herein, which contains at least one carbon carbon double bond or one carbon carbon triple bond.

As used herein, the term "heterocycloalkyl" or "heterocyclyl" refers to a heteroalicyclic group containing one to four ring heteroatoms each selected from O, S and N. In one embodiment, each heterocycloalkyl group has from 4 to 10 atoms in its ring system, with the proviso that the ring of said group does not contain two adjacent O or S atoms. In another embodiment, the heterocycloalkyl group is fused with an aromatic ring. In one embodiment, the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

An example of a 3-membered heterocycloalkyl group includes, and is not limited to, aziridine. Examples of 4-membered heterocycloalkyl groups include, and are not limited to, azetidine and a beta lactam. Examples of 5-membered heterocycloalkyl groups include, and are not limited to, pyrrolidine, oxazolidine and thiazolidinedione. Examples of 6-membered heterocycloalkyl groups include, and are not limited to, piperidine, morpholine and piperazine. Other non-limiting examples of heterocycloalkyl groups are:

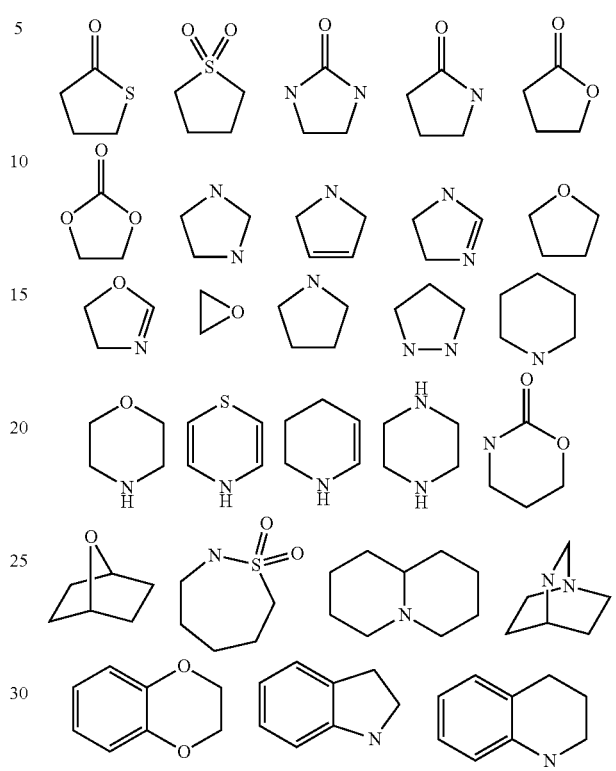

Examples of non-aromatic heterocycles include monocyclic groups such as aziridine, oxirane, thiirane, azetidine, oxetane, thietane, pyrrolidine, pyrroline, pyrazolidine, imidazoline, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin, and hexamethyleneoxide.

As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl," employed alone or in combination with other terms, means, unless otherwise stated, a carbocyclic aromatic system containing one or more rings (typically one, two or three rings), wherein such rings may be attached together in a pendent manner, such as a biphenyl, or may be fused, such as naphthalene. Examples of aryl groups include phenyl, anthracyl, and naphthyl. Preferred examples are phenyl and naphthyl, most preferred is phenyl.

As used herein, the term "aryl-($C_1$-$C_3$)alkyl" means a functional group wherein a one- to three-carbon alkylene chain is attached to an aryl group, e.g., —$CH_2CH_2$-phenyl. Preferred is aryl-$CH_2$— and aryl-$CH(CH_3)$—. The term "substituted aryl-($C_1$-$C_3$)alkyl" means an aryl-($C_1$-$C_3$)alkyl functional group in which the aryl group is substituted. Preferred is substituted aryl($CH_2$)—. Similarly, the term "heteroaryl-($C_1$-$C_3$)alkyl" means a functional group wherein a one to three carbon alkylene chain is attached to a heteroaryl group, e.g., —$CH_2CH_2$-pyridyl. Preferred is heteroaryl-(CH$_2$)—. The term "substituted heteroaryl-(C$_1$-C$_3$) alkyl" means a heteroaryl-(C$_1$-C$_3$)alkyl functional group in which the heteroaryl group is substituted. Preferred is substituted heteroaryl-(CH$_2$)—.

As used herein, the term "heteroaryl" or "heteroaromatic" refers to a heterocycle having aromatic character. A polycyclic heteroaryl may include one or more rings that are partially saturated. Examples include the following moieties:

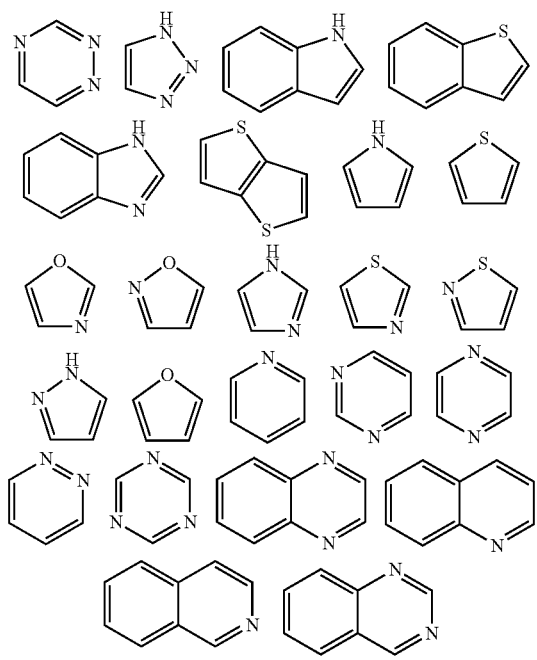

Examples of heteroaryl groups also include pyridyl, pyrazinyl, pyrimidinyl (particularly 2- and 4-pyrimidinyl), pyridazinyl, thienyl, furyl, pyrrolyl (particularly 2-pyrrolyl), imidazolyl, thiazolyl, oxazolyl, pyrazolyl (particularly 3- and 5-pyrazolyl), isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles and heteroaryls include indolyl (particularly 3-, 4-, 5-, 6- and 7-indolyl), indolinyl, quinolyl, tetrahydroquinolyl, isoquinolyl (particularly 1- and 5-isoquinolyl), 1,2,3,4-tetrahydroisoquinolyl, cinnolinyl, quinoxalinyl (particularly 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (particularly 3-, 4-, 5-, 6- and 7-benzofuryl), 2,3-dihydrobenzofuryl, 1,2-benzisoxazolyl, benzothienyl (particularly 3-, 4-, 5-, 6-, and 7-benzothienyl), benzoxazolyl, benzothiazolyl (particularly 2-benzothiazolyl and 5-benzothiazolyl), purinyl, benzimidazolyl (particularly 2-benzimidazolyl), benzotriazolyl, thioxanthinyl, carbazolyl, carbolinyl, acridinyl, pyrrolizidinyl, and quinolizidinyl.

As used herein, the term "substituted" means that an atom or group of atoms has replaced hydrogen as the substituent attached to another group. The term "substituted" further refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two.

As used herein, the term "optionally substituted" means that the referenced group may be substituted or unsubstituted. In one embodiment, the referenced group is optionally substituted with zero substituents, i.e., the referenced group is unsubstituted. In another embodiment, the referenced group is optionally substituted with one or more additional group(s) individually and independently selected from groups described herein.

In one embodiment, the substituents are independently selected from the group consisting of oxo, halogen, —CN, —NH$_2$, —OH, —NH(CH$_3$), —N(CH$_3$)$_2$, alkyl (including straight chain, branched and/or unsaturated alkyl), substituted or unsubstituted cycloalkyl, substituted or unsubstituted heterocycloalkyl, fluoro alkyl, substituted or unsubstituted heteroalkyl, substituted or unsubstituted alkoxy, fluoroalkoxy, —S-alkyl, S(=O)$_2$alkyl, —C(=O)NH[substituted or unsubstituted alkyl, or substituted or unsubstituted phenyl], —C(=O)N[H or alkyl]$_2$, —OC(=O)N[substituted or unsubstituted alkyl]$_2$, —NHC(=O)NH [substituted or unsubstituted alkyl, or substituted or unsubstituted phenyl], —NHC(=O)alkyl, —N[substituted or unsubstituted alkyl]C(=O)[substituted or unsubstituted alkyl], —NHC(=O)[substituted or unsubstituted alkyl], —C(OH)[substituted or unsubstituted alkyl]$_2$, and —C(NH$_2$)[substituted or unsubstituted alkyl]$_2$. In another embodiment, by way of example, an optional substituent is selected from oxo, fluorine, chlorine, bromine, iodine, —CN, —NH$_2$, —OH, —NH(CH$_3$), —N(CH$_3$)$_2$, —CH$_3$, —CH$_2$CH$_3$, —CH(CH$_3$)$_2$, —CF$_3$, —CH$_2$CF$_3$, —OCH$_3$, —OCH$_2$CH$_3$, —OCH(CH$_3$)$_2$, —OCF$_3$, —OCH$_2$CF$_3$, —S(=O)$_2$—CH$_3$, —C(=O)NH$_2$, —C(=O)—NHCH$_3$, —NHC(=O)NHCH$_3$, —C(=O)CH$_3$, and —C(=O)OH. In yet one embodiment, the substituents are independently selected from the group consisting of C$_{1-6}$ alkyl, —OH, C$_{1-6}$ alkoxy, halo, amino, acetamido, oxo and nitro. In yet another embodiment, the substituents are independently selected from the group consisting of C$_{1-6}$ alkyl, C$_{1-6}$ alkoxy, halo, acetamido, and nitro. As used herein, where a substituent is an alkyl or alkoxy group, the carbon chain may be branched, straight or cyclic, with straight being preferred.

As used herein, the term "instructional material" includes a publication, a recording, a diagram, or any other medium of expression that may be used to communicate the usefulness of the compositions or methods of the invention. In one embodiment, the instructional material may be part of a kit useful for preparing a composition of the invention. The instructional material of the kit may, for example, be affixed to a container that contains a composition of the invention or be shipped together with a container that contains a composition. Alternatively, the instructional material may be shipped separately from the container with the intention that the recipient uses the instructional material and a composition cooperatively. For example, the instructional material is for use of a kit; instructions for use of a composition; or instructions for use of a formulation of a composition.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DISCLOSURE

In one aspect, the present invention relates to a novel class of cross-linkable (i.e., curable) imidazolium-functionalized poly(RTIL) materials, as well as a curing method applicable to these materials. The compositions of matter and methods of the present invention allow for the preparation of high RTIL-content, rapidly-cured, stable, thin composite films, which find use for example in gas separations.

As described herein, imidazolium-functionalized poly(RTIL)s containing pendant curable groups that may undergo UV-initiated polymerization were synthesized and isolated. The structure and purity of these curable poly(RTIL)s were verified by $^1$H NMR spectroscopy. In one embodiment, cross-linked poly(RTIL)-RTIL composite films containing more than 50 wt % RTIL were prepared from curable imidazolium-functionalized poly(RTIL)s and imidazolium-functionalized RTILs. In another embodiment, composite films comprising these novel curable poly(RTIL)s formed more rapidly than composite films based on cross-linking polymerizable RTIL monomers. In yet another embodiment, "pre-gel" viscosities were substantially higher in curable poly(RTIL) systems compared to cross-linking monomer systems.

In another aspect, the present invention further relates to the unexpected discovery of high-diffusivity poly(RTIL)-RTIL solid-liquid composites wherein the poly(RTIL) is prepared from step-growth imidazolium-based RTIL monomers. Such composites are useful as $CO_2$/light gas separation membrane materials.

In yet another aspect, the present invention relates to the unexpected discovery of novel methods of preparing thin, supported RTIL-containing polymeric films. The methods of the invention overcome or circumvent poor performance issues arising from penetration or leaching of RTIL out of the cast polymer/RTIL layer. The films prepared using the methods of the invention have superior gas permeance over films prepared using methods described in the prior art. In one embodiment, the films of the invention have increased gas selectivity and/or permeance over films prepared using methods described in the prior art, at least due to the presence of the RTIL in the film. In another embodiment, the films of the invention have increased $CO_2$ selectivity and/or permeance over films prepared using methods described in the prior art, at least due to the presence of the RTIL in the film. The methods of the invention avoid the use of a gutter layer, which greatly reduces the overall gas permeance and selectivity of the composite membrane.

Compositions, Films and Membranes

The invention contemplates the use of a composition comprising a curable imidazolium-functionalized poly(RTIL) homopolymer. The homopolymer of the invention comprises a plurality of polymerized monomeric units, wherein the imidazolium ring of each polymerized monomeric unit is substituted with a curable group.

Non-limiting examples of curable imidazolium-functionalized homopolymers are illustrated in FIG. 1. The polymeric backbones of the curable imidazolium-functionalized homopolymers contemplated within the invention may be based on poly(ethylene) (i.e., functionalized poly(styrene), poly(acrylate) or poly(ethylene)), poly(ethylene oxide), or any other polymeric backbone known in the art. Each one of poly(RTIL)s 1-4 in FIG. 1 comprises a side chain comprising a substituted 5-membered imidazolium ring. In one embodiment, the 3-position of the imidazolium ring is substituted with a curable Z group, which allows for the controllable cross-linking of these linear polymers in the presence of an external stimulus (e.g., light or heat). As would be understood by one skilled in the art, the imidazolium ring may be substituted with a curable Z group at any position on the ring. In one embodiment, the 4-position of the imidazolium ring is substituted with a curable Z group. In another embodiment, the 5-position of the imidazolium ring is substituted with a curable Z group. The contemplated substituents W, Y, X, A, R, $R_1$ or Z are listed for illustrative purposes only. One skilled in the art would contemplate modifying these substituents to prepare derivatives or analogues of these compounds, all of which are also contemplated within the invention. The invention is thus not limited to the specific substituents W, Y, X, A, R, $R_1$ or Z illustrated herein.

The invention further contemplates the use of a composition comprising a curable imidazolium-functionalized poly(RTIL) copolymer, wherein the copolymer comprises a plurality of polymerized monomeric units, wherein, for a mole fraction (i.e., 1–p) of the plurality of polymerized monomeric units, a substituent on the imidazolium ring comprises a curable or polymerizable group. In one embodiment, the mole fraction ranges for about 0% to about 100%. In another embodiment, the mole fraction is less than 100%. In yet another embodiment, the mole fraction ranges for about 0% to about 90%. In yet another embodiment, the mole fraction ranges for about 0% to about 80%. In yet another embodiment, the mole fraction ranges for about 0% to about 70%. In yet another embodiment, the mole fraction ranges for about 0% to about 60%. In yet another embodiment, the mole fraction ranges for about 0% to about 50%. In yet another embodiment, the mole fraction ranges for about 0% to about 40%. In yet another embodiment, the mole fraction ranges for about 0% to about 30%. In yet another embodiment, the mole fraction ranges for about 0% to about 20%. In yet another embodiment, the mole fraction ranges for about 0% to about 10%.

Figure 2:
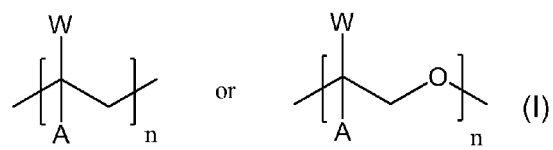
FIG. 2 is a non-limiting illustration of curable imidazolium-based poly(RTIL) copolymers useful within the invention. Curable poly(RTIL) copolymers 5-8 are based on imidazolium-functionalized poly(styrene), poly(acrylate), poly(ethylene) and poly(ethylene oxide) polymers, respectively. A is H, alkyl or substituted alkyl. W is the side chain, which in one embodiment is not the same for all monomeric units (i.e., p is not 0 or 1). R is $C_1$-$C_6$ alkylene, $C_2$-$C_6$ alkenylene or $C_2$-$C_6$ alkynylene, wherein R is optionally substituted. $R_1$ is NH or O. Each occurrence of Y is independently selected from the group consisting of H, alkyl, benzyl, phenyl, hydroxyl, nitro, halo, —$(CH_2CH_2O)_m$A and —$O(CH_2CH_2O)_m$A, wherein m is an integer ranging from 1 to 20, further wherein each Y is optionally independently substituted. X is a counteranion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, alkyl or aryl sulfonate (such as mesylate or tosylate), and any combinations thereof n ranges from 2 to 100,000
Figure 2:
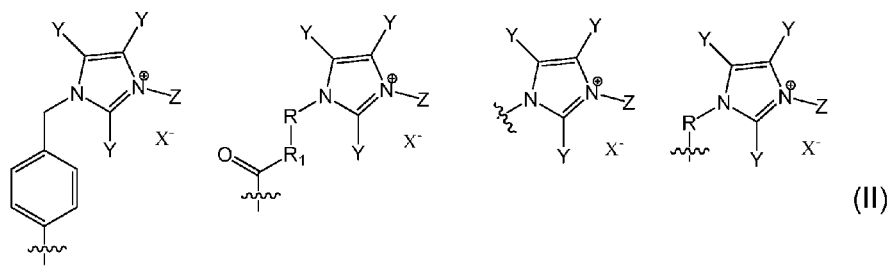
Figure 2:
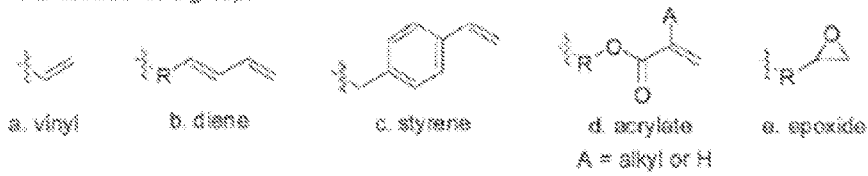
Figure 2:
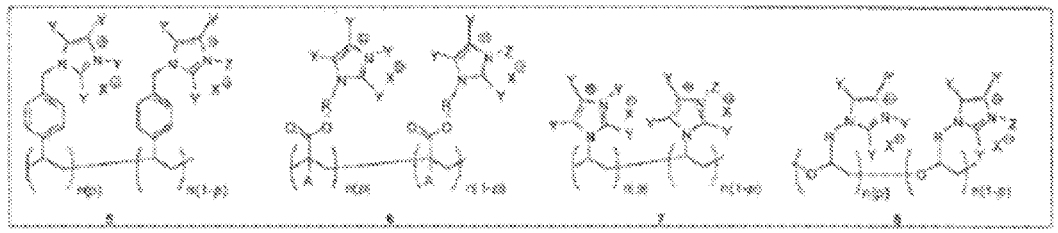

Non-limiting examples of the curable copolymers are illustrated in FIG. 2. Compared to the curable poly(RTIL) homopolymers illustrated in FIG. 1, the polymers illustrated in FIG. 2 comprises at least two distinct monomeric units comprising an imidazolium group. In one monomeric unit, the imidazolium group is substituted at the 3-position with a reactive (curable) Z group, and in the other monomeric unit, the imidazolium group is substituted at the 3-position with a non-reactive (non-curable) Z group. The quantity p (FIG. 2) denotes the mole fraction of pendant imidazolium groups that contain a non-curable Z group. Using the synthetic technique described herein or known to those skilled in the art, the value of p can be modified from p=0 (i.e., a curable homo-poly(RTIL), FIG. 1) to p=1 (i.e., a non-reactive homo-poly(RTIL)). The chemical groups listed for W, Y, X, A, R, $R_1$ or Z illustrate examples of curable poly(RTIL) copolymer structures contemplated within the invention, but such description are non-limiting in scope. One skilled in the art would contemplate modifying these substituents to prepare derivatives or analogues of these compounds, all of which are also contemplated within the invention. It would also be obvious to those skilled in the art that more than one type of non-reactive and one type of reactive pendant imidazolium groups may be used to make curable poly(RTIL) copolymer structures, all of which are also contemplated within the invention.

The invention also contemplates the use of a composition comprising a curable poly(RTIL) homopolymer or copolymer; and an imidazolium-functionalized RTIL; further optionally comprising a photo- or thermal (radical) initiator. In one embodiment, the composition is not cured. In another embodiment, the composition is cured. The composition of the invention may be used to form a curable poly(RTIL)-RTIL composite film. In one embodiment, at least 50 wt % of the composition comprises the imidazolium-functionalized RTIL. In another embodiment, the composition is homogeneously blended. In yet another embodiment, a low-boiling co-solvent (e.g., acetone) is used to aid in homogenizing the blend, wherein the solvent may then be removed via dynamic vacuum (at room temperature). In yet another embodiment, the imidazolium-functionalized RTIL is non-polymerizable/non-curable (i.e., does not comprise functional groups that may take part in polymerization reactions). The composition may then be exposed to light or a heat source to initiate radical chain-addition polymerization and form a cross-linked network. The amount of initiator, the UV light source and intensity, the temperature, and the polymerization time may be altered to afford polymer films with varying properties.

Non-limiting examples of imidazolium-functionalized RTILs contemplated within the inventions are of formula (III):

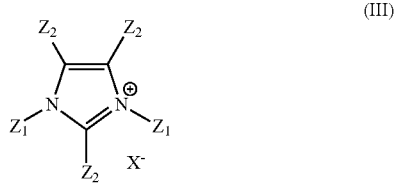

Figure 3:
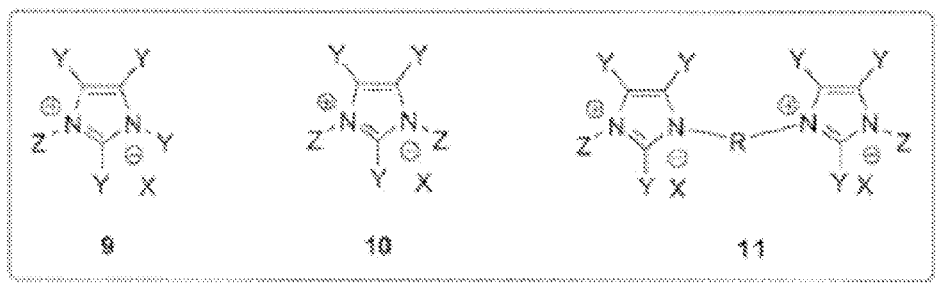
FIG. 3 is a non-limiting illustration of imidazolium-based RTIL monomers that may be used in the curable poly (RTIL)-RTIL composite films of the invention.
Figure 3:
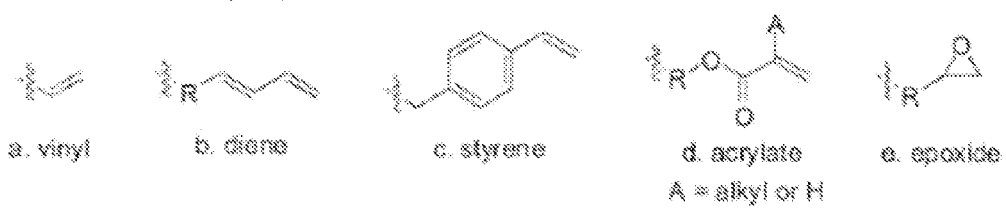

(III)

wherein $X^-$ is an anion; each occurrence of $Z_1$ is independently selected from the group consisting of alkyl, alkenyl, alkynyl, and aryl groups having 1 to 20 carbon atoms; each occurrence of $Z_2$ is independently selected from the group consisting of H, alkyl, alkenyl, alkynyl, and aryl groups having 1 to 20 carbon atoms In one embodiment, the pre-polymerization composition further includes an imidazolium-functionalized RTIL monomer (Carlisle et al., 2012, J. Membr. Sci. 397-398:24-37). Inclusion of the "small-molecule" imidazolium monomers allows for further control of network, and ultimately, composite film properties. General structures of imidazolium-functionalized monomeric species to be blended in pre-polymer mixtures are illustrated in FIG. 3.

In one embodiment, at least 50 wt % of the composition is comprised of the imidazolium-functionalized RTIL, and the balance of mass is comprised of the curable poly(RTIL) (excluding mass of initiator and initiator fragments). In another embodiment, at least 50 wt % of the composition is comprised of the imidazolium-functionalized RTIL, and the balance of mass in the film comprises curable poly(RTIL) and RTIL monomer (excluding mass of initiator and initiator fragments). In the latter case, the mass fraction of RTIL monomer in the total mass of RTIL monomer and curable poly(RTIL) varies from about 0% to about 100%. The invention contemplates various composite film compositions, all of which comprise a curable imidazolium-functionalized poly(RTIL), an imidazolium-functionalized RTIL, and optionally a RTIL monomer.

The compositions of the invention may exist as salts. In one embodiment, the anion comprises $Tf_2N^-$, tetrafluoroborate ($BF_4^-$), dicyanamide [$N(CN)_2^-$], hexafluorophosphate ($PF_6^-$), $C(CN)_3^-$, $B(CN)_4^-$, $N(SO_2F)_2^-$, $TfO^-$, $SbF_6^-$, $Cl^-$, $Br^-$, alkyl or aryl sulfonates (such as mesylate or tosylate). For example, salts with bromine anions may be prepared similarly to salts with chlorine anions, except that chloride is replaced with bromide on the electrophile. Other salts can be prepared by ion exchange in water or other solvents. Anion-exchange can be achieved using alkali metal or ammonium salts of these anions.

The composition may further comprise a solvent for formulation or delivery of the non-polymerized composition of the invention (e.g. for solvent casting). In one embodiment, the solvent is an organic solvent. The organic solvent may be any low boiling point organic solvent that dissolves the monomer. A mixture of one or more solvents may also be used. Organic solvents useful in the preparation of compositions of this invention may be any solvent known in the art, including but not limited to dichloromethane, acetonitrile, diethyl ether and methanol, which is able to dissolve the desired components. In another embodiment, the solvent is water. Preferably, any solvent used does not degrade or chemically change the components, or cause unwanted chemical reactions.

In one embodiment, the composition of the invention further comprises at least one photoinitiator: a molecule that, upon irradiation with a given wavelength at a given intensity for a given period of time, generates at least one species capable of catalyzing, triggering or inducing a polymerization or cross-linking. A photoinitiator known in the art may be employed, such as a benzoin ether and a phenone derivative such as benzophenone or diethoxyacetophenone. In one embodiment, the irradiation comprises ultraviolet electromagnetic radiation (wavelength from about 10 nm to about 400 nm), visible electromagnetic radiation (wavelength from about 400 nm to about 750 nm) or infrared electromagnetic radiation (radiation wavelength from about 750 nm to about 300,000 nm). In another embodiment, the electromagnetic radiation comprises ultraviolet or visible electromagnetic radiation.

Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In one embodiment, the UV light source emits light between about 350 nm and about 400 nm. In some embodiments, the UV light source emits light between about 400 nm and about 500 nm.

Non-limiting examples of the photoinitiator contemplated within the invention are:
1-hydroxy-cyclohexyl-phenyl-ketone (Irgacure™ 184; Ciba, Hawthorne, N.J.);
a 1:1 mixture of 1-hydroxy-cyclohexyl-phenyl-ketone and benzophenone (Irgacure™ 500; Ciba, Hawthorne, N.J.);
2-hydroxy-2-methyl-1-phenyl-1-propanone (Darocur™ 1173; Ciba, Hawthorne, N.J.);
2-hydroxy-1-[4-(2-hydroxyethoxy)phenyl]-2-methyl-1-propanone (Irgacure™ 2959; Ciba, Hawthorne, N.J.);
methyl benzoylformate (Darocur™ MBF; Ciba, Hawthorne, N.J.);

oxy-phenyl-acetic acid 2-[2-oxo-2-phenyl-acetoxy-ethoxy]-ethyl ester;
oxy-phenyl-acetic 2-[2-hydroxy-ethoxy]-ethyl ester;
a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (Irgacure™ 754; Ciba, Hawthorne, N.J.);
alpha,alpha-dimethoxy-alpha-phenylacetophenone (Irgacure™ 651; Ciba, Hawthorne, N.J.);
2-benzyl-2-(dimethylamino)-1-[4-(4-morpholinyl)-phenyl]-1-butanone (Irgacure™ 369; Ciba, Hawthorne, N.J.);
2-methyl-1-[4-(methylthio)phenyl]-2-(4-morpholinyl)-1-propanone (Irgacure™ 907; Ciba, Hawthorne, N.J.);
a 3:7 mixture of 2-benzyl-2-(dimethylamino)-1-[4-(4-morpholinyl)phenyl]-1-butanone and alpha,alpha-dimethoxy-alpha-phenylacetophenone per weight (Irgacure™ 1300; Ciba, Hawthorne, N.J.);
diphenyl-(2,4,6-trimethylbenzoyl) phosphine oxide (Darocur™ TPO; Ciba, Hawthorne, N.J.);
a 1:1 mixture of diphenyl-(2,4,6-trimethylbenzoyl)-phosphine oxide and 2-hydroxy-2-methyl-1-phenyl-1-propanone (Darocur™ 4265; Ciba, Hawthorne, N.J.);
phenyl bis(2,4,6-trimethyl benzoyl) phosphine oxide, which may be used in pure form (Irgacure™ 819; Ciba, Hawthorne, N.J.) or dispersed in water (45% active, Irgacure™ 819DW; Ciba, Hawthorne, N.J.);
a 2:8 mixture of phosphine oxide, phenyl bis(2,4,6-trimethyl benzoyl) and 2-hydroxy-2-methyl-1-phenyl-1-propanone (Irgacure™ 2022; Ciba, Hawthorne, N.J.);
Irgacure™ 2100, which comprises phenyl-bis(2,4,6-trimethylbenzoyl)-phosphine oxide);
bis-(eta 5-2,4-cyclopentadien-1-yl)-bis-[2,6-difluoro-3-(1H-pyrrol-1-yl)phenyl]-titanium (Irgacure™ 784; Ciba, Hawthorne, N.J.);
(4-methylphenyl) [4-(2-methylpropyl)phenyl]-iodonium hexafluorophosphate (Irgacure™ 250; Ciba, Hawthorne, N.J.);
2-(4-methylbenzyl)-2-(dimethylamino)-1-(4-morpholinophenyl)-butan-1-one (Irgacure™ 379; Ciba, Hawthorne, N.J.);
4-(2-hydroxyethoxy)phenyl-(2-hydroxy-2-propyl)ketone (Irgacure™ 2959; Ciba, Hawthorne, N.J.);
bis-(2,6-dimethoxybenzoyl)-2,4,4-trimethylpentylphosphine oxide;
a mixture of bis-(2,6-dimethoxybenzoyl)-2,4,4-trimethylpentylphosphine oxide and 2-hydroxy-2-methyl-1-phenyl-propanone (Irgacure™ 1700; Ciba, Hawthorne, N.J.);
titanium dioxide; and mixtures thereof.

The photoinitator may be used in amounts ranging from about 0.01 to about 25 weight percent (wt %) of the composition, more preferably from about 0.1 to about 20 weight percent (wt %) of the composition, more preferably from about 1 to about 15 weight percent (wt %) of the composition, more preferably from about 1 to about 10 weight percent (wt %) of the composition.

The invention further includes a composition comprising a poly(RTIL)-RTIL solid-liquid composite based on imidazolium-based step-growth poly(RTIL)s in combination with imidazolium RTILs. The resulting step-growth poly(RTIL)-RTIL solid-liquid composites have superior performance advantages when applied as $CO_2$/light gas membrane materials. In one embodiment, a step-growth poly(RTIL)-RTIL solid-liquid composite may be made by reacting an imidazolium bis(epoxide) step-growth monomer with commercially available amine-containing monomers in the presence of free RTIL to form composites with an imidazolium-based epoxide-amine resin matrix. Such synthesis allows for the fine-tuning of the properties of the final product by varying at least the following parameters: nature of bis(epoxide) monomers, nature of amine monomers (which may be mono, di, tetra, or other polyamines, wherein the amino groups may be primary or secondary), concentrations of RTIL incorporated, and structures of RTILs incorporated.

As described herein, supported films prepared from these new composites were shown to be appropriate for $CO_2$/light gas separations, with very good selectivity and diffusivity values. The concept of a high gas diffusivity solid-liquid composites based on step-growth poly(RTIL)s/networks plus an incorporated liquid RTIL is completely unprecedented in the prior art. The use of these materials as effective $CO_2$/light gas separation membrane materials is unprecedented.

In one embodiment, the synthetic methods described herein for preparing highly pure and isolatable imidazolium bis(epoxide) step-growth monomers are novel and easily scalable, affording isolatable monomer. Further, the system described herein cured much faster than previously patented system (minutes to ca. 1 h at room temperature to 70° C. for the compositions of the invention vs. the 1-2 h at 150-200° C. needed for curing in the prior systems (Paley et al., 2010, U.S. Pat. Appl. No. 2010/0004389 A1; Libb et al., 2010, PCT Pat. Appl. No. WO 2010/002438 A1).

Non-limiting examples of imidazolium-functionalized bis (epoxide) step-growth monomers contemplated within the invention are of formula (IV):

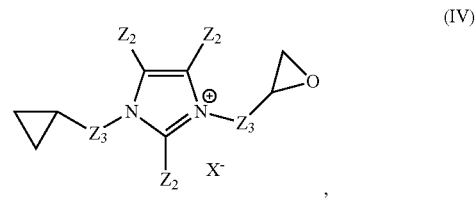

(IV)

wherein in (IV) $X^-$ is an anion; each occurrence of $Z_3$ is independently $C_1$-$C_{20}$ alkylene, wherein one or more methylene groups are optionally replaced with —O—; and each occurrence of $Z_2$ is independently selected from the group consisting of H, alkyl, alkenyl, alkynyl, and aryl groups having 1 to 20 carbon atoms.

The invention includes a composition comprising a porous support, wherein at least a portion of the surface of the porous support is coated with a thin, supported, RTIL-containing polymeric film, further wherein a RTIL is dispersed in at least a portion of the pores of the solid support.

The invention further includes a composition comprising a thin, supported, RTIL-containing polymeric film on a porous support, wherein the film is prepared by a method comprising the steps of: contacting at least a portion of the surface of the solid support with a first composition comprising a RTIL and a polymer, thereby generating a first film on the solid support; and, contacting the first film with a second composition comprising a RTIL, thereby generating the thin, supported RTIL-containing polymeric film.

The invention further includes a composition comprising a thin, supported, RTIL-containing polymeric film on a porous support, wherein the film is prepared by a method comprising the steps of: contacting at least a portion of the surface of a solid support with a first composition comprising a polymer, thereby generating a first polymeric film on the solid support; contacting the first polymeric film with a second composition comprising a RTIL; and, swelling the first polymeric film and gelling the RTIL in the swollen polymeric film, thereby generating a thin, supported, RTIL-containing polymeric film on the porous support.

In one embodiment, the composition comprising the polymer is dissolved in a first solvent prior to being contacted with the surface of the solid support. In another embodiment, the composition comprising a RTIL is dissolved in a second solvent prior to being contacted with the surface of the solid support. In one embodiment, the first solvent is an organic solvent. In another embodiment, the first solvent is water. In yet another embodiment, the second solvent is an organic solvent. In yet another embodiment, the second solvent is water. In yet another embodiment, the first solvent and the second solvent are the same solvent. In a further embodiment, the composition comprising a polymer and a RTIL is dissolved in a solvent prior to being contacted with the surface of the solid support.

The polymerized and non-polymerized compositions described herein may be used to construct thin films and membranes. The films and membranes of the invention may be free-standing or be constructed on the surface and/or internal pores of a porous support.

In one embodiment, the compositions are embedded or located within the pores of a support. In yet another embodiment, in the portions of the support containing the compositions of the invention, the compositions of the invention fill enough of the pore space of the support so that separation process is controlled by the compositions of the invention. In yet another embodiment, the compositions of the invention are present throughout the thickness of the support, so that the thickness of the composite membrane may be taken as the thickness of the support. During fabrication of the composite membrane, the non-polymerized mixture may be applied to only a portion of the surface of the support. The compositions of the invention may be retained within the support by mechanical interlocking of the compositions of the invention with the support.

In one embodiment, the compositions of the invention form a layer on the surface of the support; this layer acts as a membrane. In another embodiment, the thickness of this layer is less than about 10 microns, less than about 5 microns, less than about 2 microns, less than about 1 micron, or less than 0.5 micron. Optionally, the membrane or film has a thickness of less than about 500 nanometers, less than about 200 nanometers, or less than about 150 nanometers. In yet another embodiment, the polymerizable compositions of the invention may be polymerized into the form of a thin film having a thickness from about 50 nm to about 200 micrometers.

In one embodiment, the porous support is hydrophilic. As used herein, a hydrophilic support is wettable by water and capable of spontaneously absorbing water. The hydrophilic nature of the support may be measured by methods known to those skilled in the art, including measurement of the contact angle of a drop of water placed on the membrane surface, the water absorbency (weight of water absorbed relative to the total weight, U.S. Pat. No. 4,720,343) and the wicking speed (U.S. Pat. No. 7,125,493). The observed macroscopic contact angle of a drop of water placed on the membrane surface may change with time. In one embodiment, the contact angle of a 2 µL drop of water placed on the support surface (measured within 30 seconds) is less than 90 degrees, from 5 degrees to 85 degrees, 0 degrees to 30 degrees or is about 70 degrees. In another embodiment, the membrane is fully wetted by water and soaks all the way through the membrane after about one minute. Hydrophilic polymeric supports include supports formed of hydrophilic polymers and supports that have been modified to make them hydrophilic. In another embodiment, the support is hydrophobic.

In one embodiment, the porous support in this system is selected so that the diameter of the pores is less than about 10 microns. In another embodiment, the support is microporous or ultraporous. In yet another embodiment, the support has a pore size ranging from 0.005 micron to 10 micron, ranging from 0.01 micron to 0.1 micron, ranging from 0.1 micron to 10 microns, ranging from 0.5 micron to 5 microns, ranging from 0.5 micron to 1 micron, or less than about 0.1 micron. The characteristic pore size of the membrane may depend on the method used to measure the pore size. Methods used in the art to determine the pore size of membranes include Scanning Electron Microscopy analysis, capillary flow porometry analysis (which gives a mean flow pore size), measurement of the bubble pressure (which gives the largest flow pore size), and porosimetry.

The porous support membrane gives physical strength to the composite structure. The support should also be thermally stable over approximately the same temperature range as the RTIL membranes to be used. The support is selected to be compatible with the monomer solution, as well as to be compatible with the liquid or gas to be filtered. When the monomer solution and the support are compatible, the support is resistant to swelling and degradation by the monomer solution. In one embodiment, the organic solvents used in the monomer solution and the support are selected to be compatible so that the support is substantially resistant to swelling and degradation by the organic solvent. Swelling and/or degradation of the support by the solvent can lead to changes in the pore structure of the support.

The porous support may be made of any suitable material known to those skilled in the art including polymers, metals, and ceramics. In one embodiment, the porous polymer support comprises polyethylene (including high-molecular-weight and ultra-high-molecular-weight polyethylene), polyacrylonitrile (PAN), polyacrylonitrile-co-polyacrylate, polyacrylonitrile-co-polymethylacrylate, polysulfone (PSf), Nylon-6,6, poly(vinylidene difluoride), polycarbonate, or any combinations thereof. In another embodiment, the support may be a polyethylene support or a support of another polymer mentioned above (which may include surface treatments to affect the wettability of the support). In yet another embodiment, the support is a micropore polyethylene support such as Solupor® E075-9H01A. The support may also be an inorganic support such as a nanoporous alumina disc (Anopore, J Whatman, Ann Arbor, Mich.). The porous support may also be a composite membrane.

Synthesis

The invention includes a method of preparing a curable poly(RTIL). According to the method, a monomer unit comprising a side chain functional group capable of undergoing nucleophilic displacement or addition may be polymerized, yielding a polymer comprising a plurality of monomeric units comprising a side chain functional group capable of undergoing nucleophilic displacement or addition. Non-limiting examples of such functional groups are benzyl halides, benzyl mesylates, benzyl tosylates, alkyl halides, alkyl mesylates or alkyl tosylates.

In one embodiment, the polymer is reacted with an imidazole derivative comprising a curable group at the 3-position of the imidazole ring (such as, but not limited to, a vinyl group, a 1,3-diene group, a styrene group, an acrylate group, an epoxide group, or a combination thereof). In another embodiment, the polymer is reacted with a mixture comprising an imidazole derivative comprising a curable group at the 3-position of the imidazole ring and an imidazole derivative comprising a non-curable group at the 3-position of the imidazole ring. In yet another embodiment, the polymer comprises a N—H-imidazolyl group and the polymer is reacted with a reagent comprising a functional group capable of undergoing nucleophilic displacement or addition and a curable group, whereby the functional group capable of undergoing nucleophilic displacement reacts with the N—H-imidazolyl group. In yet another embodiment, the polymer comprises a N—H-imidazolyl group and the polymer is reacted with a mixture comprising (i) a reagent comprising a functional group capable of undergoing nucleophilic displacement or addition and a curable group, and (ii) a reagent comprising a functional group capable of undergoing nucleophilic displacement or addition and a non-curable group, whereby the functional group capable of undergoing nucleophilic displacement reacts with the N—H-imidazolyl group. Non-limiting examples of a reagent comprising a functional group capable of undergoing nucleophilic displacement or addition and a curable group are chloromethylstyrene, bromomethylstyrene, iodomethylstyrene, mesylmethylstyrene and tosylmethylstyrene.

The resulting polymer counteranion may then be ion exchanged to any anion of choice (such as, but not limited to, $NTf_2^-$, $OTr^-$, $OAc^-$, $PF_6^-$, $BF_4^-$, $DCA^-$).

In a non-limiting example, a curable poly(RTIL) contemplated within the invention may be prepared by (1) polymerizing commercially available 4-chloromethylstyrene to afford poly(4-chloromethylstyrene) (PCMS); (2) reacting PCMS with an excess of a derivatized imidazole containing a curable group (such as bat not limited to, vinyl, 1,3-diene, or acrylate), or a combination of a derivatized imidazole containing a curable group with at least one imidazole that does not possess a curable group (e.g., N-alkylimidazole); and (3) ion-exchanging the polymer chloride anion to any number of non-halogen anions.

As described elsewhere herein, imidazolium-based curable poly(RTIL)s may be blended with 50 wt % or more of an imidazolium-based RTIL and rapidly cured to afford a cross-linked poly(RTIL)-RTIL composite. Further, the curable poly(RTIL)-RTIL system was shown to react more rapidly to a tractable, solid gel than does a RTIL-based cross-linking monomer-RTIL system under identical conditions.

Figure 9:
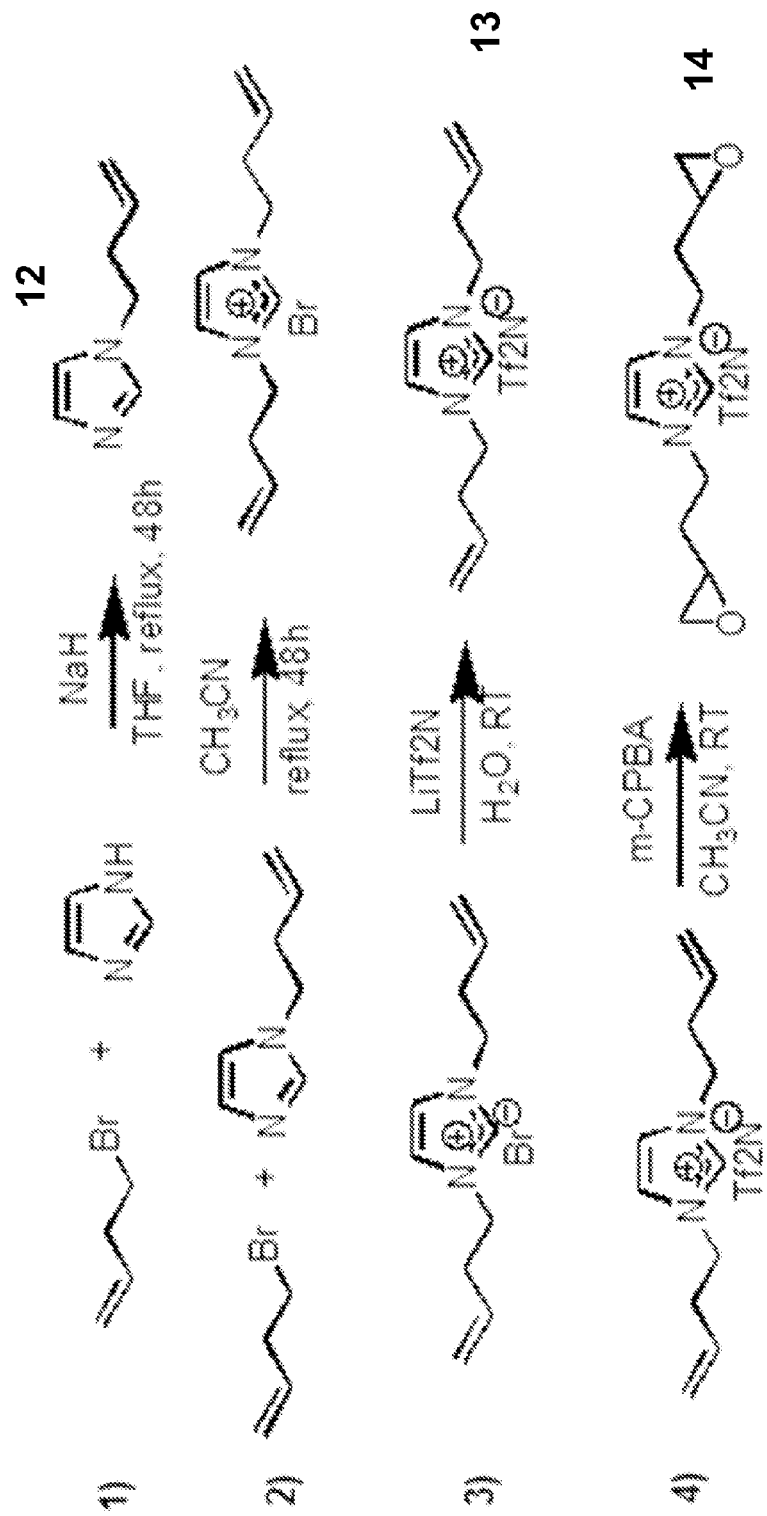
FIG. 9 is a non-limiting illustration of the synthesis of bis-epoxide RTIL monomer 14.
Figure 10:
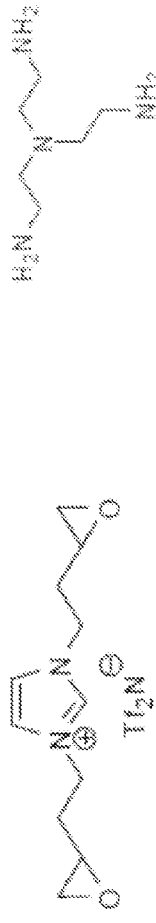
FIG. 10 is an illustration of the cross-linking of a step-growth RTIL monomer and an amine-containing step-growth monomer.
Figure 10:
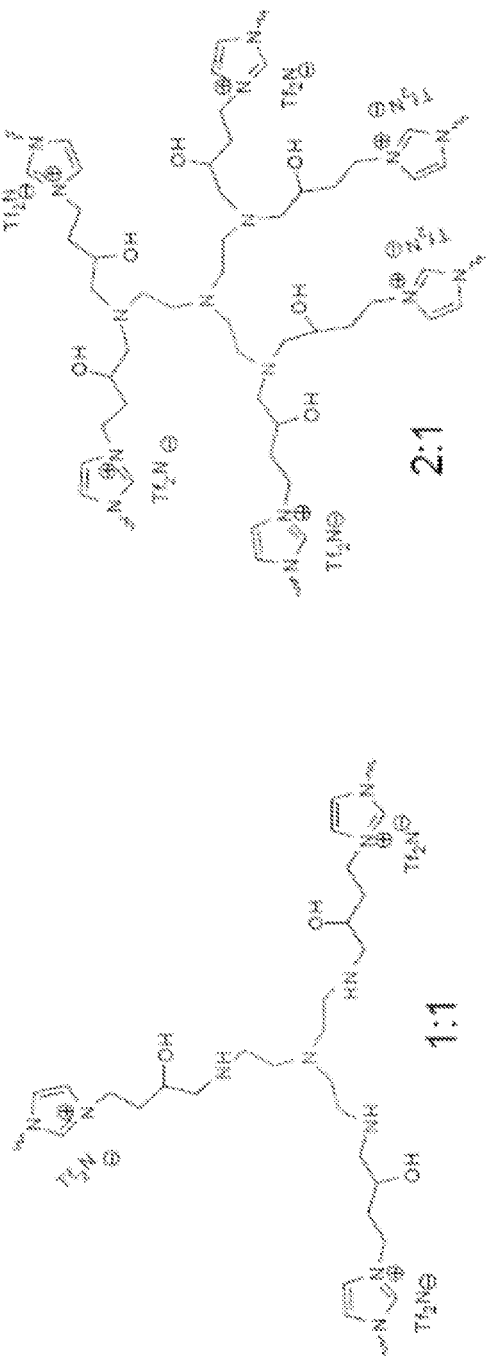

Novel bis(epoxide)-functionalized RTIL monomers may be prepared according to the chemistry outlined in FIG. 9. Imidazole may be reacted with an alkenyl halide in the presence of a base, to yield a monosubstituted imidazole derivative. The monosubstituted imidazole derivative may be reacted with the same alkenyl halide, or a distinct alkenyl halide, to yield a disubstituted imidazolium derivative. The counteranion of the imidazolium derivative may be exchanged for another counteranion, using those techniques known in the art. The alkenyl groups may then be oxidized to the corresponding epoxides using an oxidant such as but not limited to meta-chloroperbenzoic acid. The corresponding epoxide may be reacted with a multifunctional amine, wherein one way to control the stoichiometry of the cross-linking is to vary the ratio between the epoxide and the amine (FIG. 10).

Methods

The invention provides a method of preparing a membrane using the compositions of the invention. The method comprises preparing a composition comprising: a curable poly(RTIL) homopolymer or copolymer; and an imidazolium-functionalized RTIL; further optionally comprising a photo- or thermal (radical) initiator; further optionally comprising a imidazolium-functionalized RTIL monomer. The method further comprises optionally providing a porous support contacting the composition with the porous support. The method further comprises treating the composition to induce curing of the composition, whereby at least a fraction of the composition is cured.

In one embodiment where the RTIL-based material is embedded into the support, a quantity of the monomer composition is placed on a surface of the porous support membrane and then infused into the porous support. The support may be impregnated with the monomer composition using pressure to drive the monomer composition into the pores of the support. The monomer composition and support may be heated to decrease the viscosity of the composition before pressure is applied. When pressure is applied, the composition and support membrane may be sandwiched between a pair of load transfer plates (e.g., glass plates). Additionally, a pair of polymeric sheets or a hydrophobic coating on the plates may be used to facilitate release of the support composition and membrane from the load transfer plates. Suitable dense polymeric sheets that are transparent to UV or visible light include, but are not limited to, Mylar® (a biaxially-oriented polyester film made from ethylene glycol and dimethylterephthalate). The monomer composition need not completely fill the pore space of the support, but fills enough of the pore space of the support so that separation process is controlled by the pores of the RTIL-based material. In one embodiment, the monomer composition is pushed uniformly through the entire support membrane thickness.

After impregnation of the support with the monomer composition, the RTIL monomers are then polymerized. In one embodiment, the RTIL monomers can be photo cross-linked by exposure to UV light in the absence of oxygen at ambient temperature. Other temperatures as known by those skilled in the art may be used during the crosslinking process. Other methods of cross-linking as known to those skilled in the art may also be used. For example, thermal cross-linking may be performed using a cationic initiator as a cross-linking agent. The degree of cross-linking can be assessed with infrared (IR) spectroscopy. In one embodiment, the degree of polymerization is greater than 10%, or greater than 20%, or greater than 30%, or greater than 40%, or greater than 50%, or greater than 60%, or greater than 70%, or greater than 80%, or greater than 90%, or greater than 95%.

In one embodiment, the RTIL-based material may be formed as a thin, supported top-film on top of the support. In another embodiment, the coating of the RTIL monomer mixture may be formed by solution-casting the RTIL monomer mixture to make thin films on membrane supports after evaporation of a delivery solvent; doctor-blade draw-casting; or roll-casting. It is preferred that that coating be free of surface defects such as pinholes and scratches. In one embodiment, a commercial foam painting sponge or other such applicator may be used to apply the solution to the support. In another embodiment, the solution may be applied by roller casting. The amount of material on the support may be controlled by the number of applications and the concentration of the casting solution. If desired, more than one layer of solution may be applied to the support to form multiple layers of the RTIL polymer and thereby control the film thickness. Some of the solution may penetrate into the support, with the extent of penetration depending on the nature of the solution, the support, and the application process.

Without wishing to be bound by any particular theory, it is believed that some of the solution penetrates into the support, with the extent of penetration depending on the nature of the solution, the support, and the application process. While penetration of the solution may not be necessary to form a stable film on the support, the penetration of the solution into the support is believed to help attach polymer film to the support. In one embodiment, the solvent content may be controlled by limiting evaporation of solvent from the film. Evaporation of the solvent may be controlled by sandwiching the polymer film and support between polymer sheets, processing the film and support in an enclosure in which the atmosphere is controlled (e.g. the humidity level is controlled), and by other methods known to those skilled in the art. Enclosing the film can also prevent other components from entering into the film.

Membranes and films comprising RTILs present a number of unique opportunities for the processing and tailoring of polymer materials for applications including ion conduction polymers, antistatic materials, catalysis, gas separations and water vapor-permeable materials. These features allow for the formation of poly(RTIL)-RTIL composite gas separation membranes, exhibiting hybrid properties of both RTILs and polymers.

In one embodiment, the present invention includes a method of separating a first gas component from a gas mixture containing at least a first and a second gas component, the method comprising the steps of: a) providing a membrane or film of the invention as described elsewhere herein; the membrane or film having a feed side and a permeate side and being selectively permeable to the first gas component over the second gas component; b) applying a feed stream including the first and the second gas components to the feed side of the membrane; and c) providing a driving force sufficient for permeation of the first gas component through the membrane, thereby producing a permeate stream enriched in the first gas component from the permeate side of the membrane. Preferably the first gas component is carbon dioxide ($CO_2$) and the second gas component is methane ($CH_4$), hydrogen ($H_2$), or nitrogen ($N_2$).

In one embodiment, the first gas component is comprised of two or more gases. In another embodiment, the second gas component is comprised of two or more gases. In yet another embodiment, the second gas component is comprised of methane gas and at least one other gas, wherein the methane gas is present in an amount greater than the amount of the at least one other gas. In a further embodiment, the second gas component is comprised of hydrogen gas and at least one other gas, wherein the hydrogen gas is present in an amount greater than the amount of the at least one other gas. In another embodiment, the second gas component is comprised of nitrogen gas and at least one other gas, wherein the nitrogen gas is present in an amount greater than the amount of the at least one other gas.

In one embodiment, the composite materials of the present invention are utilized as catalysts. In many synthetic processes using transition metal catalysts, metal nanoparticles play an important role as the actual catalyst or as a catalyst reservoir. RTILs are an appealing medium for the formation and stabilization of catalytically active transition-metal nanoparticles. More importantly, RTILs can be made that incorporate coordinating groups, for example, with nitrile groups on either the cation or anion (CN-RTIL). In various C—C coupling reactions catalyzed by palladium catalyst, palladium nanoparticles are better stabilized in CN-RTIL compared to non-functionalized RTILs; thus enhanced catalytic activity and recyclability are realized.

In one embodiment, the present invention includes membranes and films having antistatic properties or static dissipative properties. Typically antistatic materials are considered to have a surface resistivity between approximately $10^9$ and $10^{14}$ ohm/cm$^2$, while static dissipative materials have a surface resistivity between approximately $10^6$ and $10^9$ ohm/cm$^2$. Below a surface resistivity of $10^9$ ohm/cm$^2$, charge dissipation can become uncontrolled and allow flammable sources to ignite or physically damage electronic circuits and components. In some instances, however, this type of charge dissipation may be desired, for example, if the component is electrically grounded or if low resistance methods to dissipate building charges are required. Accordingly, it is desirable to provide materials having a wide range of antistatic and charge dissipative properties.

The polymerized RTIL antistatic materials of the present invention may be formed using readily available imidazole materials, linkers, tails and polymerizable groups, and thus are relatively inexpensive to produce. Additionally, the polymerized RTIL antistatic materials may be produced using simple chemistry and environmentally friendlier starting materials than current antistatic additives. The antistatic behavior may be maximized through phase formation, and the compatibility of the polymerized RTIL and poly(RTIL)-RTIL materials may also be adjusted by changing the bridging linker between the RTIL monomers in the polymer. For example, the counterions utilized with the present antistatic materials are easily changed allowing the antistatic material to be modified according to use with specific host polymers or substrates. In one embodiment, the index of refraction of the antistatic materials can be provided to be similar to the host polymer or substrate allowing the optical-contact clarity and opacity to be fine-tuned. The polymerized RTIL antistatic materials can create a leaching form as dimer, trimer, or oligomeric forms for liquid injections markets but have little to no leaching in the polymeric form. Accordingly, the polymerized RTIL antistatic materials can acquire FDA Food Contact/USP VI certifications by selecting the right anion and non-leaching characteristics as well as utilizing imidazolium as the base building block.

The present invention further includes a method of preparing a thin, supported RTIL-containing polymeric film on a porous support. According to the method, a first liquid composition is applied to at least a portion of the surface of a solid support, wherein the liquid composition comprises a RTIL and a polymer. A RTIL/polymer film is thus generated on the surface of the solid support. The initially formed RTIL/polymer film is then re-wetted or re-infused with a second liquid composition comprising RTIL. This treatment replaces at least a portion of the RTIL that was lost from the layer due to leaching into the porous support.

In one embodiment, the second composition may be cast with or without solvent. In another embodiment, the second composition may be sprayed with or without solvent. In yet another embodiment, the initially formed RTIL/polymer film is dipped in the second composition.

In one embodiment, the second composition consists essentially of a RTIL. In another embodiment, the second composition comprises a RTIL dissolved in a solvent. In yet another embodiment, the second composition comprises a RTIL and a polymer. In yet another embodiment, the second composition comprises a curable poly(RTIL) and a RTIL. In yet another embodiment, the RTIL-to-polymer ratio ranges from about 99.9-0.1 to about 5-95. In yet another embodiment, re-wetting or re-infusing the initially formed RTIL/ polymer film with the second composition generates an IL-enriched composite film that has improved gas permeability over the initially formed RTIL/polymer film.

The present invention further includes a method of preparing a thin, supported RTIL-containing polymeric film on a porous support. According to the method, a first composition comprising a polymer is deposited on the porous support using any available and known technique, such as a solvent casting technique, as to form a thin layer of the polymer. The polymer may be ionic (e.g., poly(RTIL)) or neutral (e.g., PVDF-HFP). In one embodiment, the first composition is free of RTIL. Once the first composition has dried to a film, the film is then coated with a second composition comprising RTIL, such that the RTIL is infused into the film.

In one embodiment, the second composition may be cast with or without solvent. In another embodiment, the second composition may be sprayed with or without solvent. In yet another embodiment, the initially formed RTIL/polymer film is dipped in the second composition. In yet another embodiment, the second composition comprises a RTIL dissolved in a solvent.

In one embodiment, the second composition consists essentially of a RTIL. In another embodiment, the second composition comprises a RTIL dissolved in a solvent. In yet another embodiment, the second composition comprises a RTIL and a polymer. In yet another embodiment, the second composition comprises a curable poly(RTIL) and a RTIL. In yet another embodiment, the RTIL-to-polymer ratio ranges from about 99.9-0.1 to about 5-95.

In one embodiment, the polymer film is swelled, and the RTIL is gelled in the polymer phase either by a physical (e.g., chain entanglement or crystalline polymer domains) or chemical (e.g., covalent cross-links between polymer chains) method. In another embodiment, the second composition comprises a curable poly(RTIL), which comprises reactive groups pendant to the main polymer chain. In that case, gelation may be induced by cross-linking the second composition with the film using via UV light or heat. In yet another embodiment, the diffusion of the RTIL into the polymer film may be enhanced by the use of heat or a solvent that swells, but does not dissolve, the deposited polymer film.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. Although the description herein contains many embodiments, these should not be construed as limiting the scope of the invention but as merely providing illustrations of some of the presently preferred embodiments of the invention.

When a group of materials, compositions, components or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

Whenever a range is given in the specification, for example, a temperature range, a time range, or a composition range, all intermediate ranges and sub-ranges, as well as all individual values included in the ranges given are intended to be included in the disclosure. Moreover, all values that fall within these ranges, as well as the upper or lower limits of a range of values, are also contemplated by the present application.

It will be obvious to one of ordinary skill in the art that the invention can be performed by modifying or changing, within a wide and equivalent range, the conditions, formulations and other parameters disclosed herein without affecting the scope of the invention or any specific embodiment thereof, and that such modifications or changes are intended to be encompassed within the scope of the appended claims.

The terms and expressions that have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. In general the terms and phrases used herein have their art-recognized meaning, which can be found by reference to standard texts, journal references and contexts known to those skilled in the art. Any preceding definitions are provided to clarify their specific use in the context of the invention.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Unless described otherwise, the reagents and equipment used herein was purchased from commercial sources or prepared according to the methods described.

Imidazolium-Based RTIL Monomers

Non-limiting examples of imidazolium-based RTIL monomers, such as those reported in Carlisle et al., 2012, J. Membr. Sci. 397-398:24-37, may be prepared according to the reactions outlined in Scheme 1.

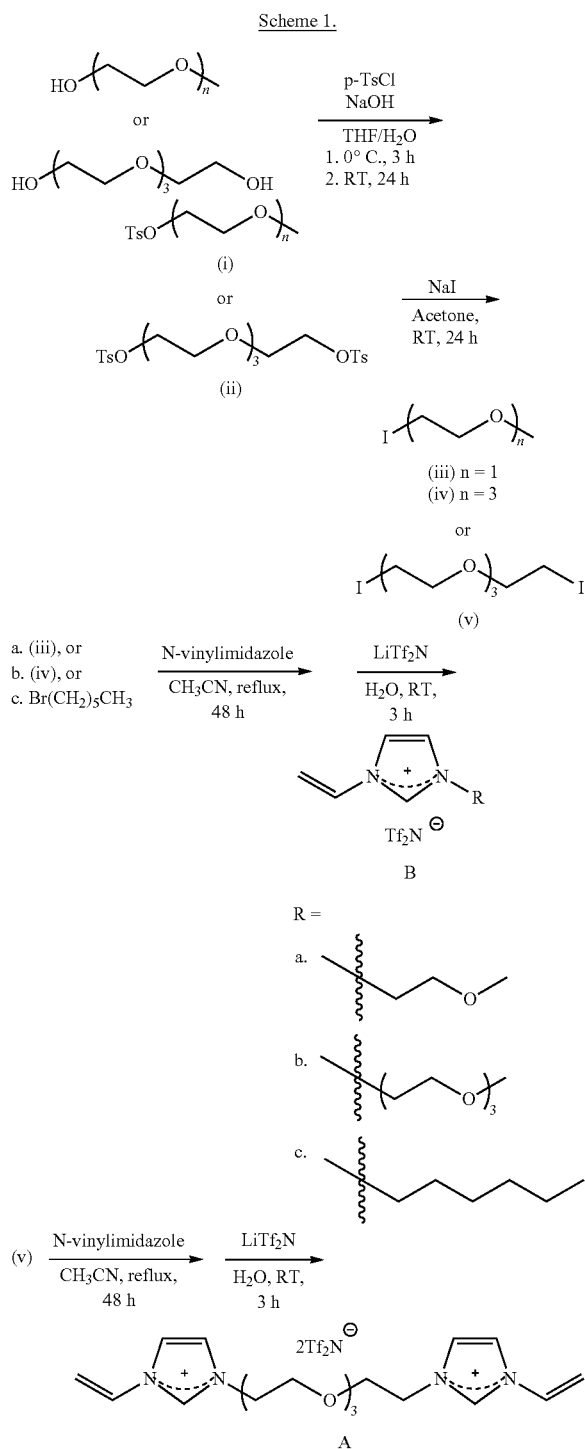

Scheme 1.

Synthesis of Monomers A, Ba, and Bb

The methods described below detail the synthesis of monomer A and are directly applicable to the synthesis of monomers Ba-Bc. Tetra(ethylene glycol) (40.0 g, 206 mmol) was dissolved in THF (137 mL) and added to a single-neck, 500-mL round-bottom flask equipped with a magnetic stir bar and placed in an ice bath. Sodium hydroxide (28.8 g, 721 mmol) was then dissolved in deionized water (137 mL) and added to the 500-mL flask while stirring the THF solution. p-Toluenesulfonyl chloride (p-TsCl) (86.4 g, 453 mmol) was dissolved in THF (135 mL) and added to a volumetric dropping funnel, which was then equipped to the neck of the 500-mL flask. The p-TsCl was added drop-wise for approximately 3 h, after which time the dropping funnel was removed and replaced with a glass stopper. The reaction was then allowed to warm up to room temperature and stirred for an additional 24 h. The reaction was then quenched with 1.2 M HCl (685 mL) and the product (a clear, slightly yellow oil) was extracted into EtOAc (350 mL) and washed with deionized water (2×500 mL), saturated $NaHCO_3$ (2×500 mL), and deionized water (2×500 mL). The organic phase was then dried over anhydrous $MgSO_4$ and filtered. EtOAc was removed via rotary evaporation followed by vacuum (<20 mtorr) for 24 h at room temperature to afford (ii) (Scheme 1) as a clear, viscous oil (88.7 g, 176 mmol). Compound ii (17.5 g, 34.7 mmol) was dissolved in acetone (130 mL) and added to a 250-mL Erlenmeyer flask equipped with a magnetic stir bar. With the solution stirring, NaI (11.45 g, 76.3 mmol) was added and a white precipitate (sodium tosylate) was observed almost immediately. The reaction was allowed to stir for 24 h at room temperature before filtering to remove the solid precipitate. Acetone was then removed from the filtrate via rotary evaporation and the product was extracted into $Et_2O$ (200 mL) to facilitate precipitation of excess NaI. The $Et_2O$ was then filtered over a plug of silica and removed via rotary evaporation followed by vacuum (<20 mtorr) for 24 h at room temperature to afford (v) as a clear, yellow liquid (13.6 g, 32.9 mmol). Compound v (13.6 g, 32.9 mmol) was dissolved in $CH_3CN$ (52 mL) and added to a 250-mL single-neck, round-bottom flask equipped with a magnetic stir bar and reflux condenser. N-vinylimidazole (7.74 g, 82.3 mmol) was added to the flask and the reaction was heated to reflux (approximately 85° C.) and stirred for 48 h. The reaction was then cooled and the product was precipitated in $Et_2O$ (275 mL) and placed in a freezer (−10° C.) for 12 h. The $Et_2O$ was then decanted, and the product was extracted into deionized water (200 mL) and washed with EtOAc (4×60 mL) and $Et_2O$ (1×60 mL). The aqueous phase was then transferred to a 500-mL Erlenmyer flask equipped with a magnetic stir bar, and $LiTf_2N$ (20.8 g, 72.4 mmol) was added. An oil precipitate was observed immediately, and the reaction was allowed to stir for 3 h at room temperature. The aqueous phase was then decanted and the product was extracted into EtOAc (250 mL) and washed with deionized water (6×100 mL) until addition of $AgNO_3$ to an aliquot of the aqueous phase did not result in precipitate formation (i.e., presence of halide). The organic phase was then dried over anhydrous $MgSO_4$ and stirred with activated charcoal for 12 h before filtering over a small plug of basic alumina EtOAc was then removed via rotary evaporation followed by vacuum (<20 mtorr) for 24 h at room temperature to afford monomer A as a clear, viscous oil (27.3 g, 91.2% yield).

Monomer A: Yield: 91.2%. $^1$H NMR (300 MHz, DMSO-$d_6$): δ 2.50 (quintet, 2H), 3.50 (m, 8H), 3.79 (t, 4H), 4.37 (t, 4H), 5.44 (dd, 2H), 5.95 (dd, 2H), 7.31 (dd, 2H), 7.86 (t, 2H), 8.19 (t, 2H), 9.40 (t, 2H). $^{13}$C NMR (75.48 MHz, DMSO-$d_6$): δ 49.1, 67.8, 69.4, 69.5, 108.7, 118.8, 119.4 (q, $CF_3$), 123.6, 128.7, 135.6. FT-IR: 1658, 1572, 1553, 1450, 953, 923, 839, 791, 763, 741 cm$^{-1}$. HRMS (m/z): calculated as $[A]^{2+}[B]^-$, 628.1329. found, 628.1319.

Monomer Ba: Yield: 97.1%. $^1$H NMR (300 MHz, DMSO-$d_6$): δ 3.28 (s, 3H), 3.71 (t, 2H), 4.39 (t, 2H), 5.43 (dd, 1H), 5.96 (dd, 1H), 7.32 (dd, 1H), 7.88 (t, 1H), 8.20 (t, 1H), 9.44 (t, 1H). $^{13}$C NMR (75.48 MHz, DMSO-$d_6$): δ 49.1, 58.1, 69.3, 108.7, 118.86, 119.5 (q, $CF_3$), 123.6, 128.8, 135.7.

FT-IR: 1659, 1572, 1553, 1478, 1453, 1013, 955, 920, 837, 791 cm$^{-1}$. HRMS (m/z): calculated as [A]$^+$, 153.1023. found, 153.1016.

Monomer Bb: Yield: 94.8%. $^1$H NMR (300 MHz, DMSO-d$_6$): δ 3.23 (s, 3H), 3.48 (m, 8H), 3.80 (t, 2H), 4.38 (t, 2H), 5.44 (dd, 1H), 5.97 (dd, 1H), 7.32 (dd, 1H), 7.89 (t, 1H), 8.20 (t, 1H), 9.40 (t, 1H). $^{13}$C NMR (75.48 MHz, DMSO-d$_6$): δ 49.2, 58.0, 67.8, 69.5, 71.2, 108.6, 121.6, 119.5 (q, CF$_3$), 123.7, 128.8, 135.7. FT-IR: 1658, 1572, 1553, 1453, 956, 924, 851, 790, 762, 740 cm$^{-1}$. HRMS (m/z): calculated as [A]$^+$, 241.1547. found, 241.1543.

Monomer Bc: Yield: 96.6%. $^1$H NMR (300 MHz, DMSO-d$_6$): δ 0.86 (t, 3H), 1.27 (m, 6H), 1.81 (quintet, 2H), 4.18 (t, 2H), 5.42 (dd, 1H), 5.94 (dd, 1H), 7.28 (dd, 1H), 7.93 (t, 1H), 8.19 (t, 1H), 9.46 (t, 1H). $^{13}$C NMR (75.48 MHz, DMSO-d$_6$): δ 13.7, 21.8, 25.1, 29.0, 30.5, 49.2, 108.5, 119.1, 119.5 (q, CF$_3$), 123.2, 125.9, 128.9. FT-IR: 1657, 1573, 1553, 1469, 1460, 954, 918, 848, 769, 763 cm$^{-1}$. HRMS (m/z): calculated as [A]$^+$, 179.1543. found, 179.1540.

Example 1

Synthesis of Curable Imidazolium-Based Poly(RTIL) Homopolymers and Copolymers

The following procedure is a non-limiting example of the synthetic route that may be used to prepare a curable poly(RTIL) homopolymer of Formula 1. This synthetic route may be easily adapted by one skilled in the art to prepare a curable poly(RTIL) homopolymer of Formula 2 or 3.

4-Chloromethylstyrene (5.00 g, 32.8 mmol) was dissolved in 5.00 g of DMF and added to a 25-mL Schlenk flask equipped with a magnetic stir bar. Thermal initiator, AIBN (0.50 wt. %, dispensed from a previously prepared stock solution of 20 wt % AIBN in DMF), was then added to the flask. The reactants were then gently mixed; avoiding any splashing that would result in part of the solution on the upper walls of the flask. The Schlenk flask was then sealed and the contents were flash-frozen using liquid nitrogen in a small Dewar flask. While the contents were freezing, the plastic line from the flask to the vacuum/inert manifold was evacuated and purged 5 times with argon (this step was performed only before the first freeze-pump-thaw cycle).

After the pre-polymer solution had frozen, the flask was evacuated until the vacuum pressure had stabilized. This step was performed while the flask was still submerged in liquid nitrogen. The flask was then sealed and placed in a room-temperature water bath to thaw the contents. Bubbles of gas were observed immediately. Once completely thawed, the flask exterior was dried with a paper towel and the contents were flash-frozen again in liquid nitrogen. Three to four more freeze-pump-thaw cycles were performed until the pressure rise upon evacuation was negligible. These steps were taken to minimize the presence of oxygen gas, during the free radical polymerization.

Once the contents were thawed on the final cycle, the flask was opened to argon purge gas and placed in an oil bath set to a temperature of 70° C. The contents were stirred vigorously. Within 3 h, many small bubbles were observed (nitrogen gas) and the reaction had become visibly more viscous. The reaction was allowed to proceed for 18 h. After cooling the reaction, the polymer solution was added dropwise to a 250-mL Erlenmeyer flask containing 200 mL of MeOH. The system was stirred vigorously to promote rapid precipitation of the polymer product.

The precipitated polymer was solid, but somewhat tacky/gummy. The MeOH was decanted and the polymer product was dissolved in ca. 8-10 mL of methylene chloride, and added drop wise to a fresh 200 mL of MeOH, as performed previously. The polymer was then isolated via filtration and dissolved in ca. 8-10 mL methylene chloride. The precipitation process was repeated 3 to 4 more times. The polymer was then dried under vacuum (<20 mtorr) for 24 h at room temperature to afford the poly(4-chloromethylstyrene) as a fine, white powder (3.99 g, 79.8% yield).

N-Vinylimidazole (0.925 g, 9.82 mmol) was measured into a 15-mL, single-neck round-bottom flask equipped with a magnetic stir bar and a reflux condenser. Poly(4-chloromethylstyrene) (1.00 g, 6.55 mmol repeat units) was dissolved in 4 mL of DMF and added to the flask. The reaction was then stirred and heated at 70° C. with slight reflux for 24 h. Within 2 h, a tacky precipitate was observed, and 1 mL of MeOH was added to the reaction to re-solubilize the reaction contents, After cooling the reaction, an additional 5 mL of MeOH were used to dilute the reaction contents. The polymer solution was then added dropwise to a 250-mL Erlenmeyer flask containing 200 mL of ethyl ether. The system was stirred vigorously, and the polymer precipitated as an off-white solid. The solids were then filtered, and the polymer was re-dissolved in ca. 10 mL MeOH and added dropwise to a 500-mL Erlenmeyer flask containing 250 mL of ethyl ether to precipitate the polymer product. The solids were again filtered and the precipitation was performed once more. The polymer product was then dried under vacuum (<20 mtorr) for 2 days at 45° C. to afford the vinylimidazolium chloride polymer as a fine white powder. A $^1$H NMR spectrum of this product revealed that >99% of the chlorine groups had been converted to vinylimidazolium.

The vinylimidazolium chloride polymer (0.823 g, ca. 3.34 mmol repeat units) was then dissolved in 6 mL of deionized water. LiTf$_2$N (10 g, 34.8 mmol) was dissolved in 8 mL of deionized water and added to a 25-mL Erlenmeyer flask equipped with a magnetic stir bar. The polymer solution was added dropwise to the solution of LiTf$_2$N, and the ion-exchanged polymer precipitated as a white, tacky solid. The precipitated polymer was stirred overnight in the LiTf$_2$N solution. The aqueous phase was then decanted and the polymer was washed with deionized water. After crudely dried with air for 10-15 min, the resulting polymer was dissolved in 6 mL of N-methylpyrrolidone (NMP) and added dropwise to 75 mL of a 0.5 M aqueous solution of LiTf$_2$N. The Tf$_2$N polymer precipitated as a white, tacky gum, and was stirred for 30 min after all of the polymer solution was added. The aqueous phase was decanted, and the polymer was washed with deionized water and air dried. The LiTf$_2$N polymer was dissolved in 6 mL of NMP and the precipitation in 0.5 M LiTf$_2$N described elsewhere herein was repeated twice more. The Tf$_2$N polymer was then washed, dried and dissolved in 6 mL of NMP and precipitated in 100 mL of deionized water. This precipitation was performed a total of 5 times to remove residual halide, which was verified by adding AgNO$_3$ to a small aliquot of wash water and observing no precipitate. The polymer was then dried in vacuum (<20 mtorr) for 2 days at 45° C. to afford the vinylimidazolium Tf$_2$N polymer as a clear, rubbery solid. A $^1$H NMR spectrum of this product revealed that >99% of the chloride anion had been removed (the singlet for the imidazolium C(2)-proton at 9.17 ppm shifted 0.43 ppm up field in the Tf$_2$N polymer).

Example 2

Synthesis of Curable Imidazolium-Based poly(RTIL) Copolymers

The following procedure is a non-limiting example of the synthetic route that may be used to prepare a curable imidazolium-based poly(RTIL) comopolymer of Formula 5. In one embodiment, 0.9). The methods described here are readily adaptable to synthesize curable poly(RTIL)s of Formula 6 or 7.

The synthesis of poly(4-chloromethylstyrene) (PCMS) was described elsewhere herein. PCMS (1.110 g, ca. 7.27 mmol repeat units) was dissolved 4 mL in DMF and added to a 15-mL round-bottom flask equipped with a reflux condenser and a magnetic stir bar. N-Vinylimidazole (0.0685 g, 0.727 mmol) was added to the flask and the contents were heated to 70° C. stirred and refluxed for 24 h. N-Methylimidazole (0.836 g, 10.2 mmol) was then added to the reaction, which had already been heated at 70° C. Within 15 min, the reaction became cloudy, and 1 mL of MeOH was added to re-dissolve the reaction contents. The reaction was heated at 70° C., stirred and refluxed for an addition 24 h. The workup procedure for this copolymer was identical to that described elsewhere herein for the vinylimidazolium chloride homopolymer. A NMR spectra of the 10 mol % vinylimidazolium chloride copolymer revealed that >99% of chloride groups had been converted to an imidazolium moiety and that 90% of the copolymer contained a pendant N-methylimidazolium group, while 10% contained a pendant N-vinylimidazolium group.

The method to ion-exchange the 10% vinylimidazolium copolymer to the $Tf_2N$ anion is identical to the method described above for the vinylimidazolium chloride homopolymer. As mentioned, the methods described elsewhere herein for the synthesis of PCMS may be adapted for the synthesis of polymers that conform to the structures shown generally as 2 and 3 (FIG. 1) and 6 and 7 (FIG. 2). The polymer structures of general Formula 4 or 8 (FIGS. 1 and 2, respectively) may require anionic or cationic initiation systems, which are readily described in the prior scientific literature and known to those skilled in the art. The reaction setup and polymer precipitation techniques described here are readily adaptable to polymers of Formula 4 or 8.

Example 3

Preparation of Thin, Supported PVDF-HFP and PVDF-HFP/RTIL Films

The following procedure is a non-limiting example of a method of the invention, whereby an RTIL (1-ethyl-3-methylimidazolium bis(trifluoromethylsulfonyl) imide, or emim $Tf_2N$) was soaked into a thin supported polymeric film. The polymeric film comprised poly(vinylidene fluoride-co-hexafluoropropylene) (linear formula: [—$CH_2CF_2$—]$_x$[—$CF_2CF(CF_3)$—]$_y$, or PVDF-HFP).

A solution of 10% w/w of PVDF-HFP in acetone was prepared by dissolving 0.5 g of the polymer in 4.5 g of acetone. A strip of porous Teflon support was placed on a clean piece of glass and secured at one end with a piece of adhesive tape.

Figure 4:
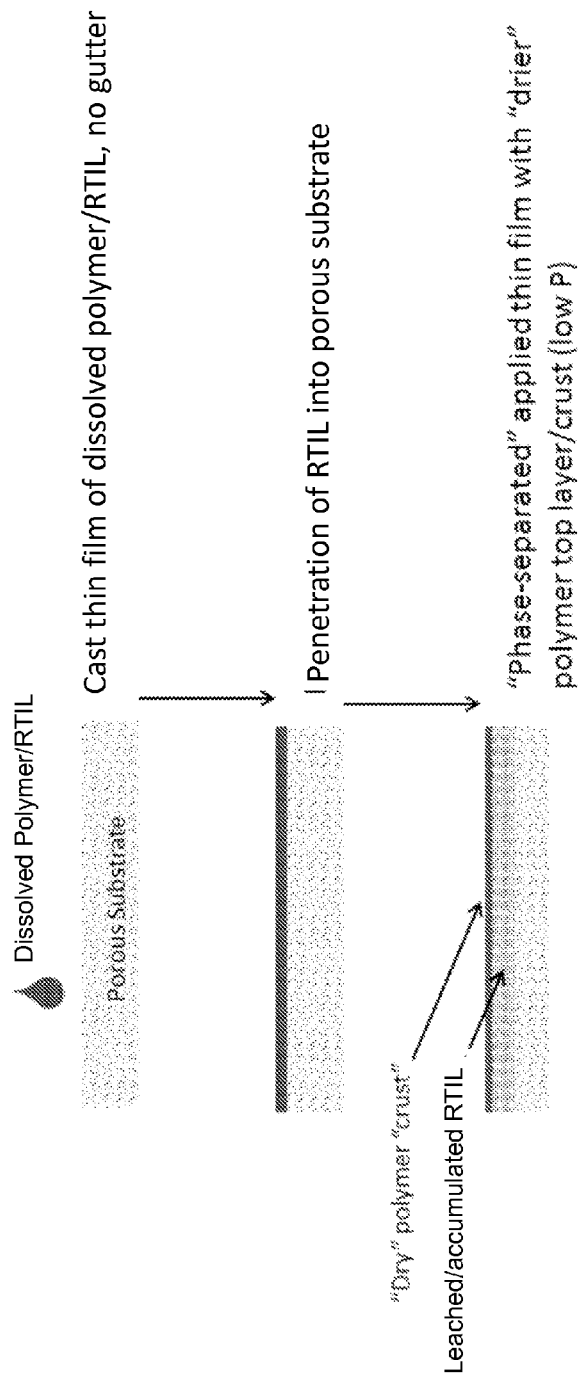
FIG. 4 is an illustrative diagram of a process of preparing a RTIL-containing thin polymer film on the surface of a porous substrate without the use of a gutter layer.
Figure 5:
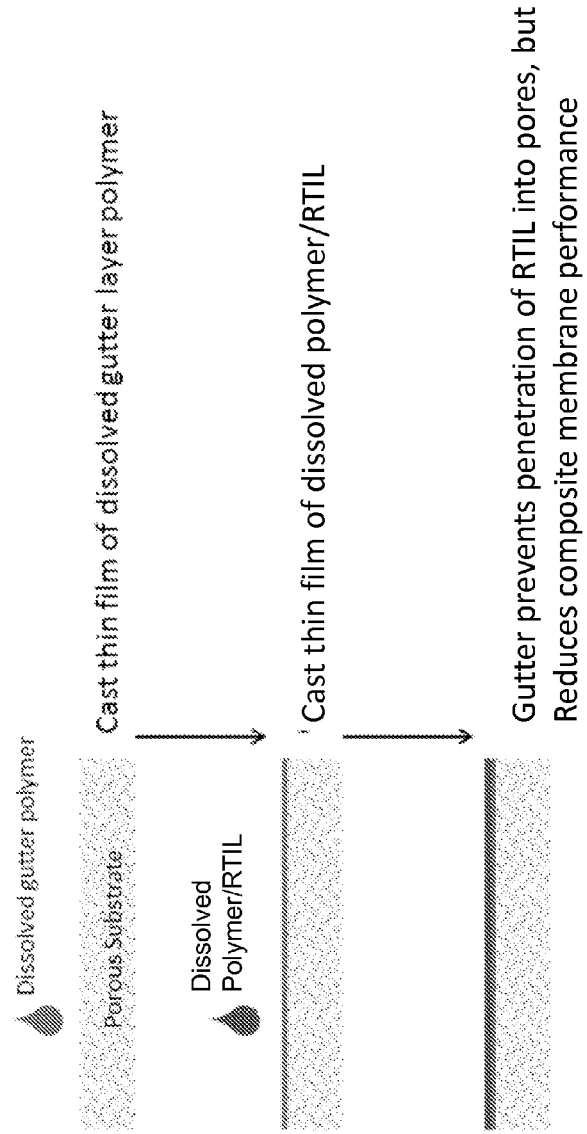
FIG. 5 is an illustrative diagram of a process of preparing a RTIL-containing thin polymer film on the surface of a porous substrate using a gutter layer.
Figure 6:
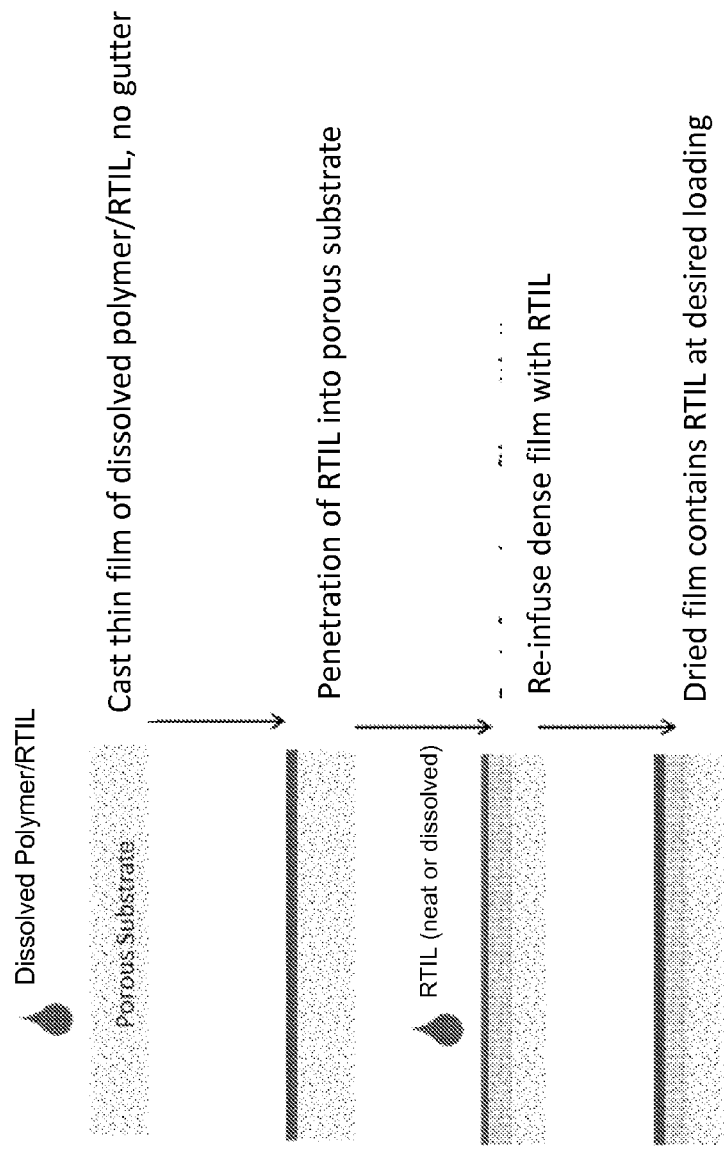
FIG. 6 is a non-limiting illustrative diagram of a process of preparing a RTIL-containing thin polymer film on the surface of a porous substrate without the use of a gutter layer. In one embodiment, the cast thin film is re-infused with a composition comprising RTIL.
Figure 7:
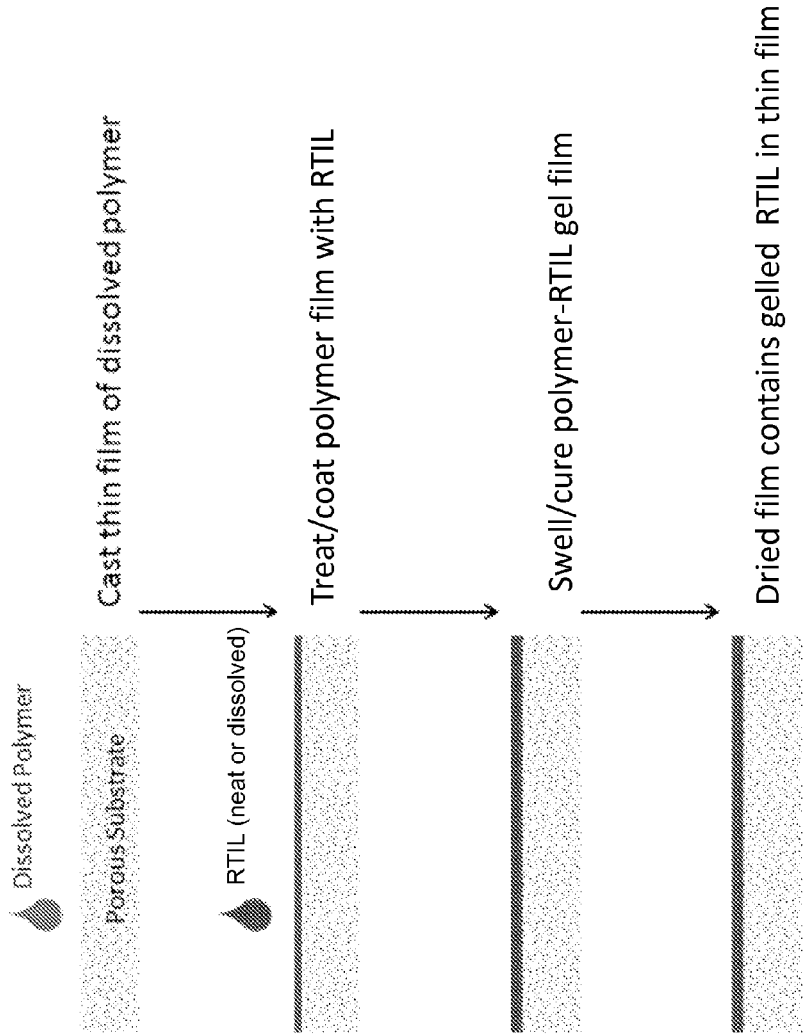
FIG. 7 is a non-limiting illustrative diagram of a process of preparing a RTIL-containing thin polymer film on the surface of a porous substrate without the use of a gutter layer. In one embodiment, the initially formed polymer film is treated or coated with a composition comprising RTIL.
Figure 8:
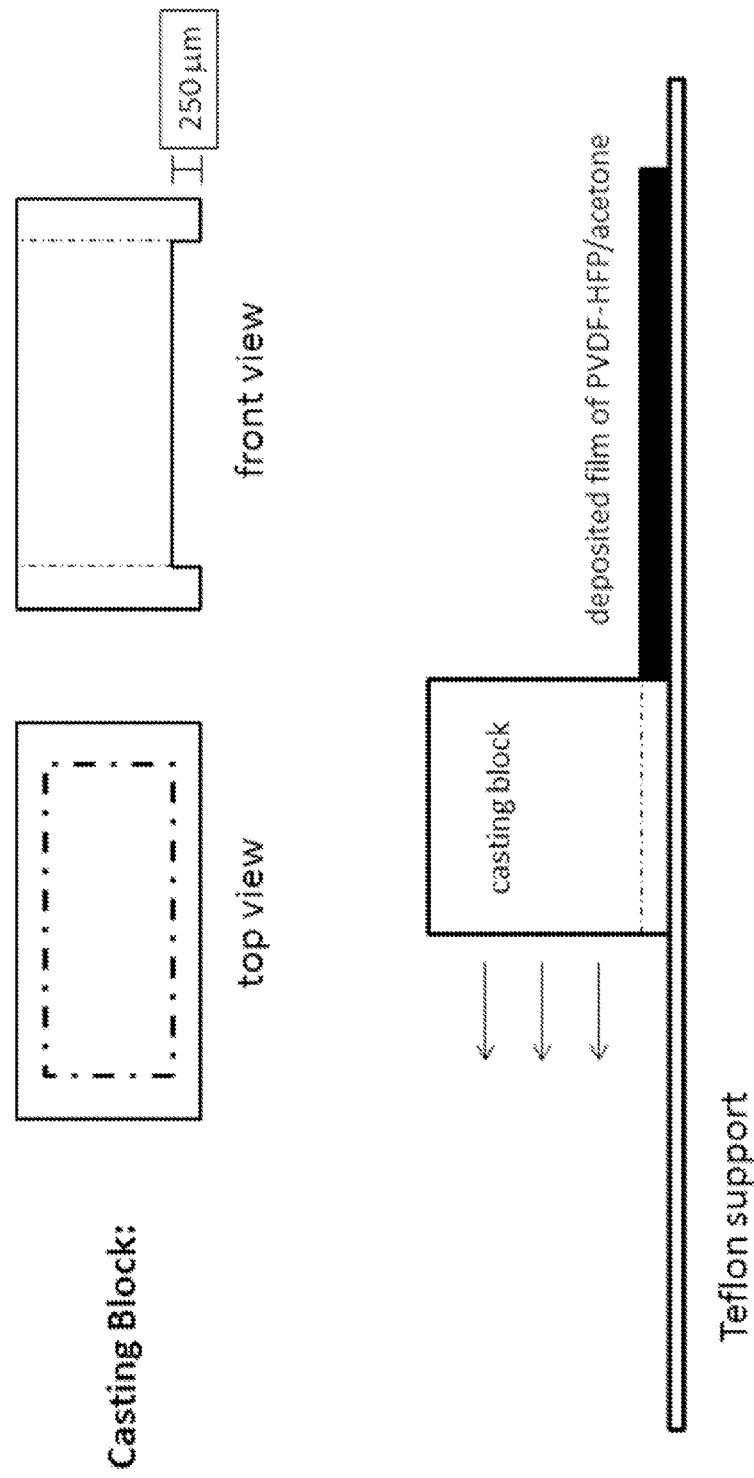
FIG. 8 is a non-limiting illustration of a casting block and its use in depositing a thin layer of polymer solution on the surface of a porous substrate (exemplified as Teflon tape).

Several drops of the PVDF-HFP solution were deposited on the Teflon strip, near the end that was taped to the glass. A 250-μm casting block (FIG. 4) was used to draw a thin film of the polymer solution.

The deposited solution was allowed to dry at room temperature for about 2 h. A sample of the film was used to prepare a masked membrane sample. The $CO_2$ permeability of the thin film was measured to be about 0.15 GPU (gas permeation units).

The masked membrane was removed from the permeation apparatus, and several drops of the RTIL (emim $Tf_2N$) were deposited on the entirety of the PVDF-HFP film. The RTIL was allowed to diffuse into the film at room temperature for 2 hours. The excess RTIL was then removed with a porous poly(ether sulfone) PES support, which was purchased from Pall and had a pore size of 0.100 micron and film thickness of approximately 140 micron.

The gaseous permeabilities measured for the neat PVDF-HFP film and the RTIL-infused PVDF-HFP film are illustrated in Table 1. The $CO_2$ permeance of the PVDF-HFP film was enhanced by 17 times after infusion with the RTIL. The $CO_2/N_2$ and $CO_2/H_2$ selectivities were found to be 31 and 3.4, respectively, after infusion with the RTIL.

TABLE 1

| membrane | $CO_2$ permeance (GPU) | $N_2$ permeance (GPU) | $H_2$ permeance (GPU) |
|---|---|---|---|
| PVDF-HFP | 0.15 | n.d. | n.d. |
| PVDF-HFP infused with RTIL (2 h) | 2.6 | 0.083 | 0.67 |

Example 4

Step-Growth Imidazolium-Based RTIL Monomers and Polymers

Prior art reports have described the synthesis of poly (RTIL)-RTIL composite membranes through free radical polymerization. As described herein, poly(RTIL)-RTIL composite membranes may be prepared using step-growth imidazolium-based RTIL monomers, such as imidazolium-based RTIL epoxide monomers, which may be reacted with amine-containing nucleophiles, such as polyamines. The advantages of the epoxide-amine chemistry are: the stoichiometry is easily controlled, there is no oxygen-based inhibition, and the chemistry is easily implemented.

Figure 11:
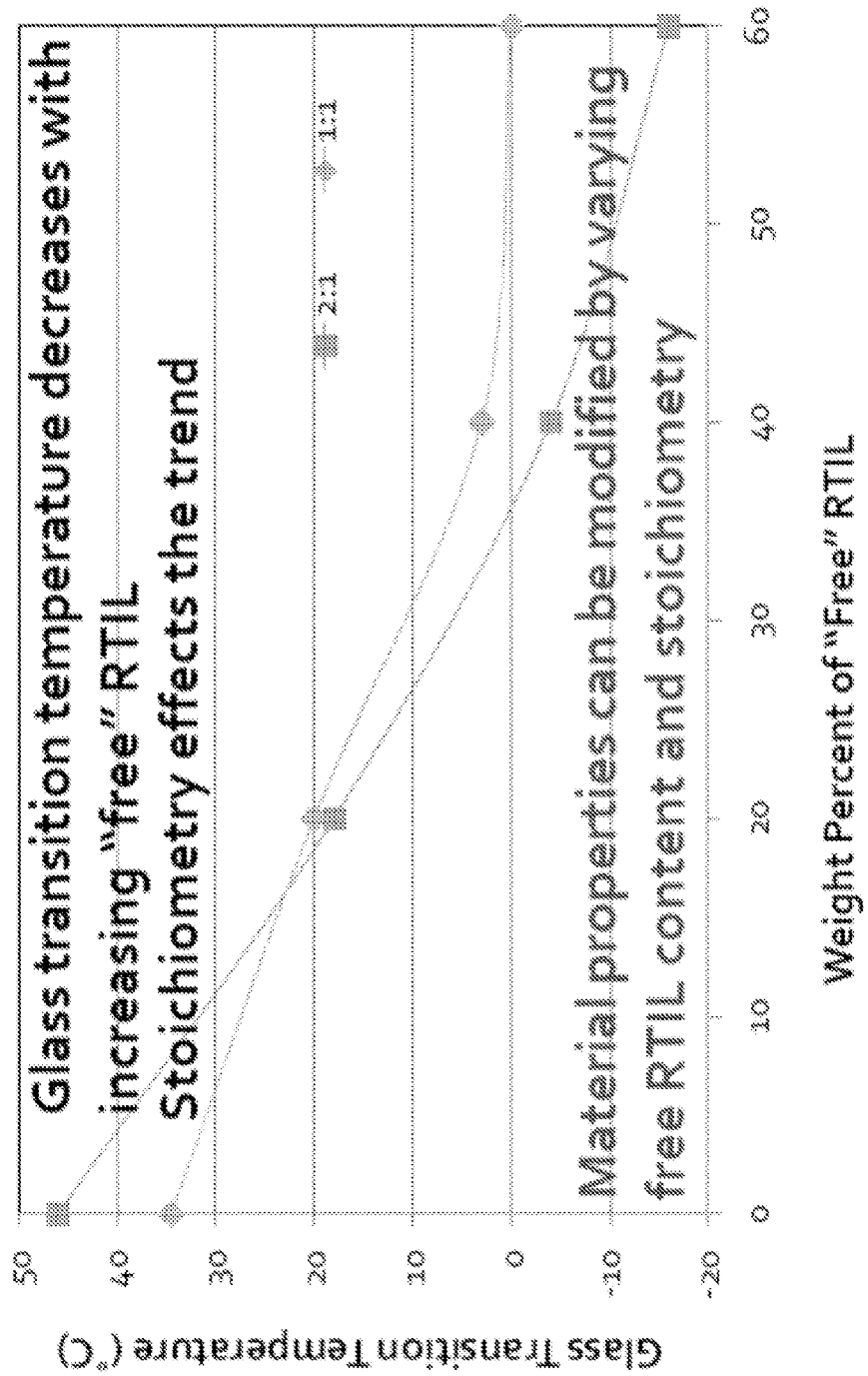
FIG. 11 is a graph illustrating glass transition temperature experimental results.

Composites of step-growth imidazolium-based RTIL polymers and free RTIL were prepared by reacting epoxide-containing RTIL monomers and amino-containing monomers in the presence of polyamines (FIG. 11). Gels of varying RTIL loading (0-75 wt %) at 1:1 epoxide-amine and 2:1 epoxide-amine stoichiometries were prepared. These gels may be characterized in terms of glass transition temperature and cross-link density (using dynamic mechanical analysis—DMA) and light gas permeabilities (using time-lag permeability apparatus).

Figure 12:
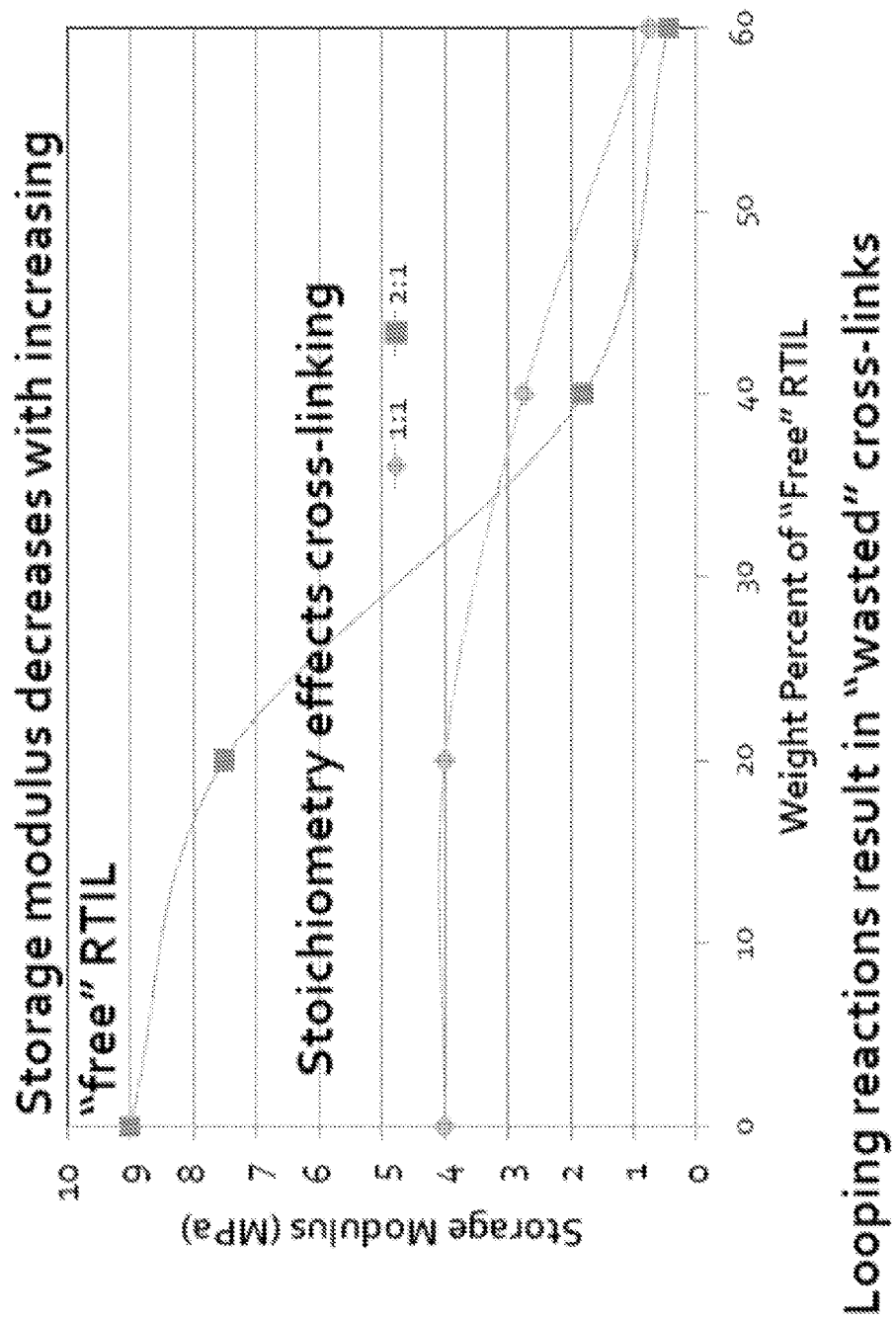
FIG. 12 is a graph illustrating storage modulus experimental results.
Figure 13:
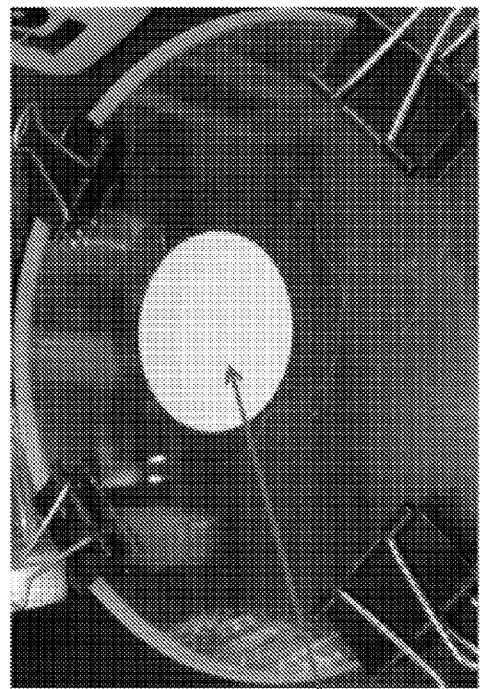
FIG. 13 is a non-limiting illustration of the preparation of a polymer comprising a step-growth RTIL monomer.
Figure 13:
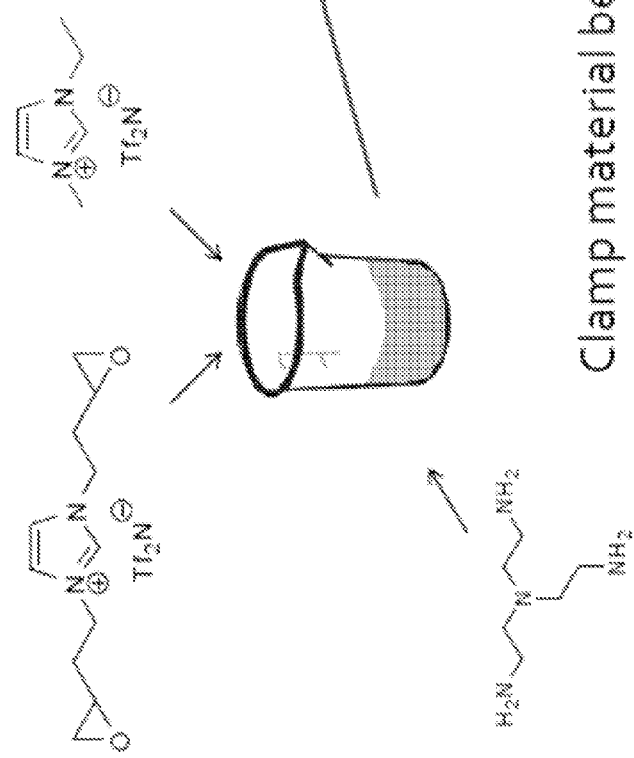

Glass transition temperature ($T_g$; FIG. 12) and storage modules (G'; FIG. 13) were determined for gels containing 0, 20, 40 and 60 wt % free RTIL at 1:1 and 2:1 stoichiometries.

Figure 14:
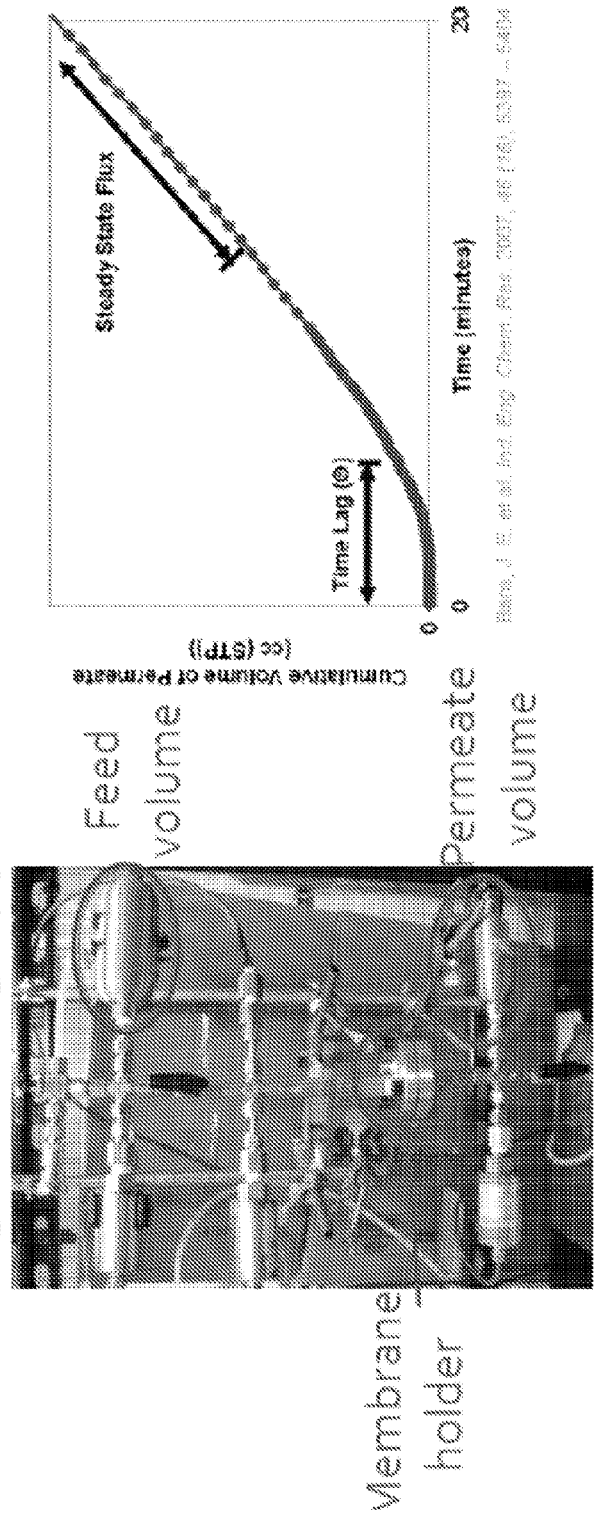
FIG. 14 is a non-limiting illustration of the measurement of single gas permeabilities using a time lag apparatus.
Figure 15:
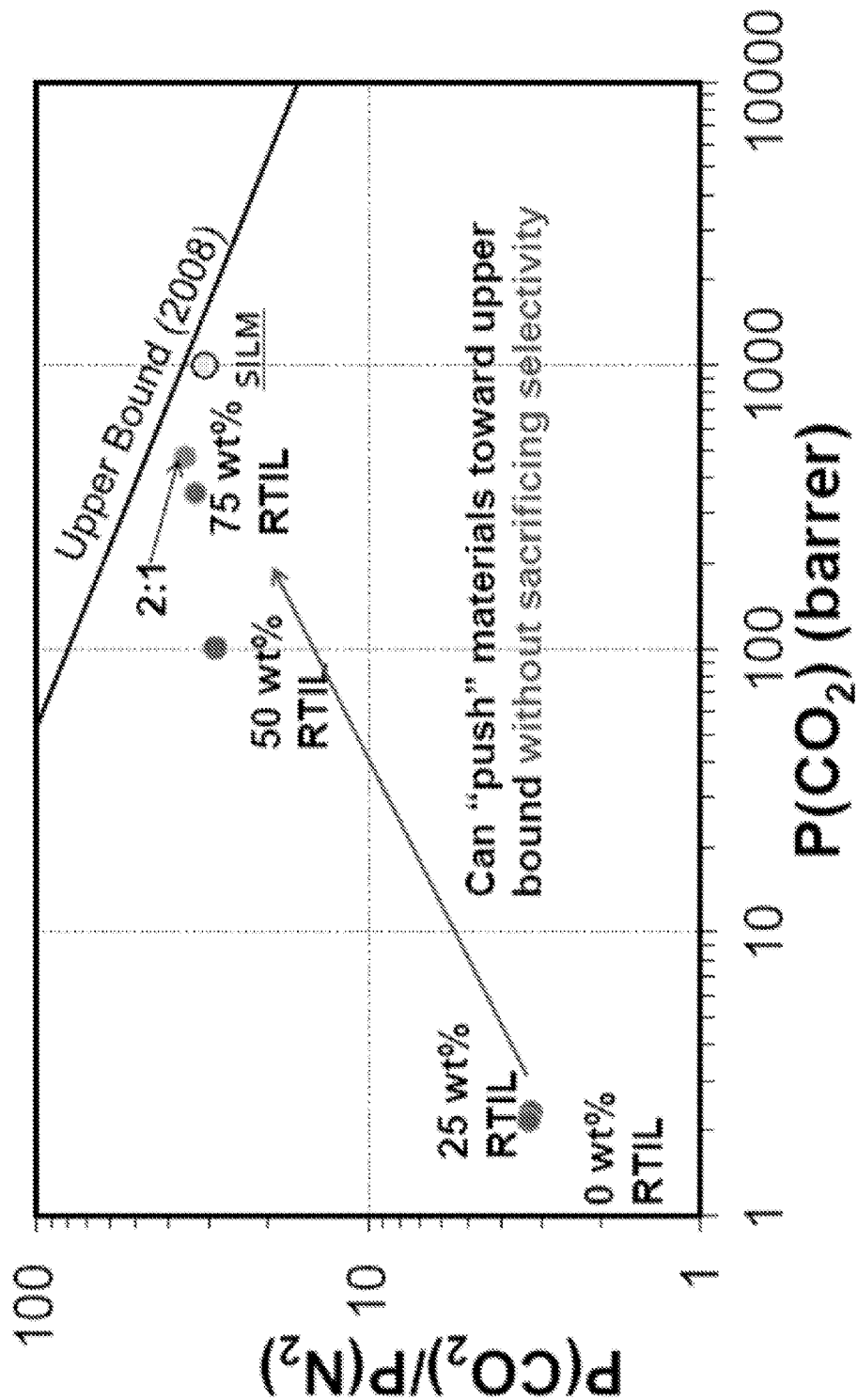
FIG. 15 is a graph illustrating relative gas permeability experimental results.
Figure 16:
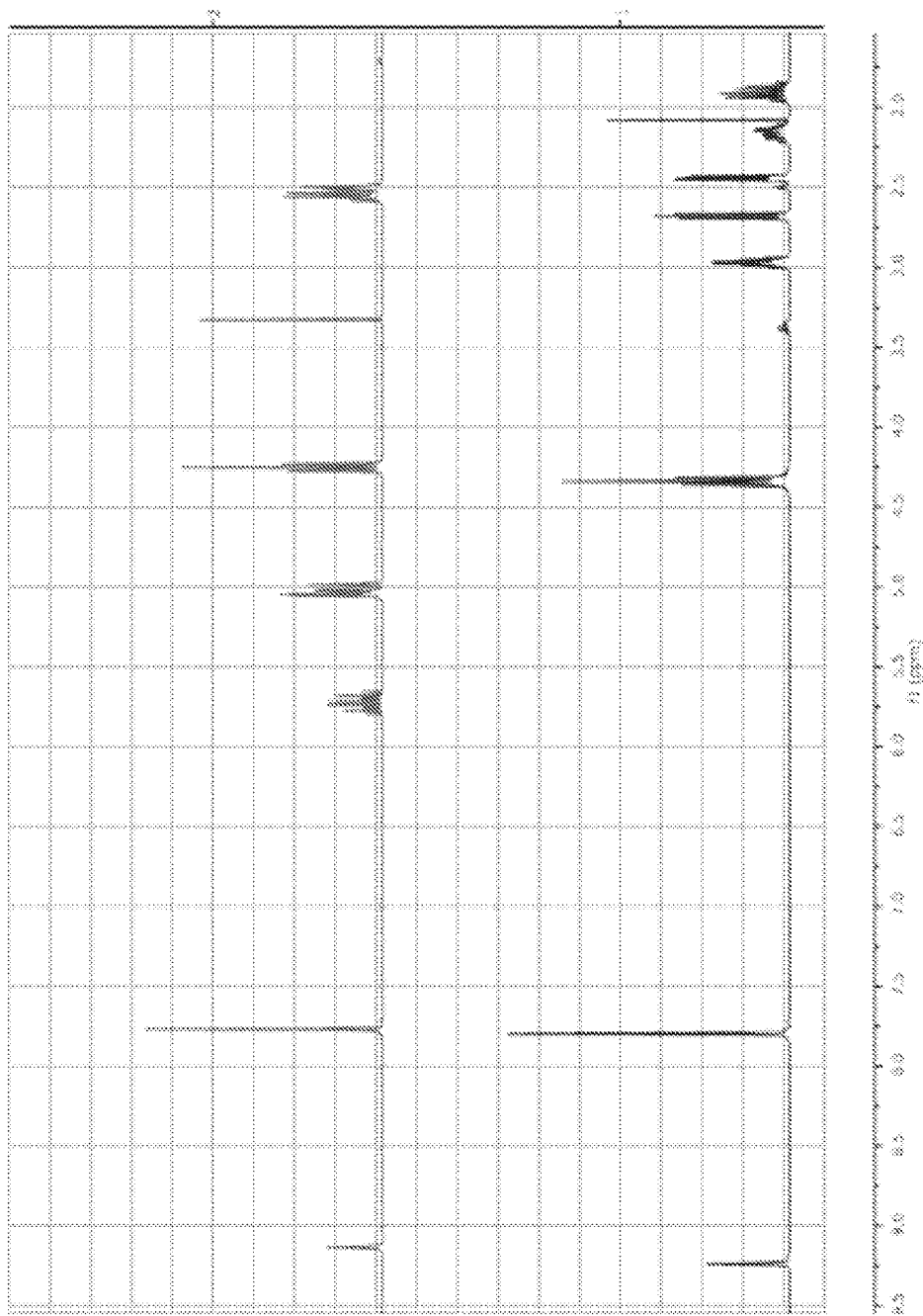
FIG. 16 is an illustration of the overlayed $^1$H NMR spectra of compound 13 (top spectrum) and bis(epoxide) monomer 14 (bottom spectrum).

A membrane composite comprising the step-growth RTIL polymer and RTIL was prepared by contacting the step-growth RTIL monomer and the amino-containing monomer, clamping the material between two glass plates on a membrane support, and heating the system for at least 3 hours at 50° C. (FIG. 14). The permeability of the material was determined using a time-lag apparatus (FIG. 15). The $CO_2/N_2$ results are illustrated in FIG. 16.

Example 5

Synthesis of bis(epoxide) RTIL Monomer

Materials and Instrumentation

4-Bromo-1-butene was purchased from TCI America (Portland, Oreg.). H-imidazole, sodium hydride (60% w/w in mineral oil), meta-chloroperoxybenzoic acid (76% w/w) and sodium iodide were purchased from Sigma-Aldrich (Milwaukee, Wis.). Lithium trifluoromethanesulfonimide (LiTf$_2$N) was purchased from 3M (St. Paul, Minn.). Anhydrous THF was prepared by passing it through a column of activated alumina. All other reagents and solvents were obtained in the highest purity available and used without additional purification. $^1$H and $^{13}$C NMR spectra were acquired with a Bruker Avance-III 300 (300 MHz).

The bis(epoxide) monomer 14 was synthesized by the exemplary reaction sequence shown in FIG. 9.

Synthesis of Butenylimidazole (12)

Butenylimidazole (12) was synthesized using previously described methods (Bara et al., 2008, J. Membr. Sci. 316: 186-191). 8.48 g (213 mmol) of NaH suspension (60 wt % in mineral oil) was added to a 3-neck 500-mL round bottom flask equipped with a reflux condenser under argon atmosphere. Approximately 200 mL of dry THF were added to dissolve/suspend the reagents. H-Imidazole (11.6 g, 170 mmol) was added to the stirring suspension incrementally. Bubbles (H$_2$ gas) evolved upon small additions of imidazole to the flask. After complete addition of the imidazole, the flask was placed in a 40° C. oil bath for one hour to promote reaction completion. 25.2 g (187 mmol) of 4-bromo-1-butene was then added to the stirring suspension under argon. The temperature of the oil bath was then increased to 65° C. and allowed to proceed for 48 h. After cooling to room temperature, the reaction suspension was filtered and washed with THF until the filtrate was clear. THF was then removed via rotary evaporation. The resulting red-brown oil was then dissolved in approximately 200 mL MeOH and washed 3 times with 75 mL hexanes to remove the mineral oil. The MeOH was then removed with rotary evaporation and 15 min on Schlenk line vacuum (less than 300 mtorr). The product was then dissolved in 200 mL DCM, washed 2 times with 75 mL DI water/brine mixture (50/50 vol %). The DCM organic phase was then dried by stirring with MgSO$_4$ and then stirred with charcoal for 30 min. The product was filtered over a 1 cm plug of basic alumina and the DCM removed via rotary evaporation and schlenk link vacuum. The product is a clear, slightly yellow oil, and $^1$H and $^{13}$C NMR data conform to those previously reported (Vitz et al., 2007, Green Chem. 9:431-433) Yield: 8.72 g, 42% (71 mmol).

Synthesis of Compound 13

8.7 g (71 mmol) of butenylimidazole (12) was dissolved in 43 mL of CH$_3$CN and added to a 250-mL single-neck, round-bottomed flask equipped with a magnetic stir bar and reflux condenser. 19.3 g (142 mmol) of 4-bromo-1-butene were added to the flask and the reaction was heated to reflux (approximately 85° C.) and stirred for 48 h. The reaction was then cooled and the product was precipitated in 400 mL of Et$_2$O and placed in the freezer (−4° C.) for 12 h. The Et$_2$O was then decanted and the product was extracted into 100 mL of DI water and washed with EtOAc (2×50 mL), hexanes (2×50 ml) and Et$_2$O (2×50 mL). The aqueous phase was then transferred to a 500 mL Erlenmeyer flask equipped with a magnetic stir bar and 22.5 g (78 mmol) of LiTf$_2$N were added. An oil precipitate was observed immediately and the reaction was allowed to stir for 3 h at room temperature. The aqueous phase was then decanted and the product was extracted into 120 mL of EtOAc and washed with DI water (75 mL) until addition of AgNO$_3$ to an aliquot of the aqueous phase did not result in precipitate formation (i.e. presence of halide). The organic phase was then dried over anhydrous MgSO$_4$ and stirred with activated charcoal for 30 min before filtering over a small plug of basic alumina EtOAc was then removed via rotary evaporation followed by vacuum (less than 20 mtorr) for 24 h at room temperature to afford compound 13 as a clear, pale yellow viscous oil. Yield: 30 g 92% (66 mmol). $^1$H and $^{13}$C NMR data conform to previously reported structure (Hahn et al., 2007, J. Organomet. Chem. 692:4630-4638).

Synthesis of bis(epoxide) Monomer 14

130 mL of CH$_3$CN was added to 30 g of stirring compound 13 (66 mmol), in a 500-mL single-neck, round-bottom flask. 59.6 g (263 mmol) of meta-chloroperoxybenzoic acid (m-CPBA) (76% w/w) were then added to the flask. The m-CPBA dissolved completely after stirring for approximately 10 min. After 3 h, a white precipitate was observed. The reaction was allowed to stir for 37 h at room temperature. At this point, the reaction was filtered, and the CH$_3$CN removed via rotary evaporation at room temperature. The flask was then quenched with Et$_2$O and placed in a −4° C. freezer for 12 h. The Et$_2$O was then decanted and an additional 200 mL of Et$_2$O was added to the flask and stirred for 8 h. The Et$_2$O was carefully decanted and replenished once more. After repeating this step a second time, the residual Et$_2$O was removed via rotary evaporation followed by vacuum to afford bis(epoxide) monomer 14 as a slightly yellow, clear oil.

Yield: 25 g 78% (51 mmol). $^1$H NMR (300 MHz, DMSO-d$_6$): δ 1.90 (dd, 2H), 2.14 (dd, 2H), 2.44 (dd, 2H), 2.68 (dd, 2H), 2.97 (m, 2H), 4.34 (t, 4H), 7.31 (dd, 2H), 7.80 (d, 2H), 9.24 (s, 1H); $^{13}$C NMR (75 MHz, DMSO): δ 136.4, 125.9 (q, CF$_3$), 122.6, 121.7 (q, CF$_3$), 117.4 (q, CF$_3$), 113.1 (q, CF$_3$), 48.9, 46.5, 45.6, 32.3; IR (cm$^{-1}$): 740, 762, 789, 841, 917, 1053, 1133, 1180, 1348, 1566, 3152.

The disclosures of each and every patent, patent application, and publication cited herein are hereby incorporated herein by reference in their entirety. One skilled in the art will readily appreciate that the present invention is well adapted to carry out the objects and obtain the ends and advantages mentioned, as well as those inherent therein. While the invention has been disclosed with reference to specific embodiments, it is apparent that other embodiments and variations of this invention may be devised by others skilled in the art without departing from the true spirit and scope used in the practice of the invention. The appended claims are intended to be construed to include all such embodiments and equivalent variations.

What is claimed is:

1. A composition comprising a curable imidazolium-functionalized poly(room temperature ionic liquid) (poly (RTIL)) copolymer, the copolymer comprising a plurality of imidazolium-functionalized monomeric units, wherein (100λ(1−p))% of the monomeric units comprise a side-chain imidazolium group substituted with a curable group, (100×p) % of the monomeric units comprise a side-chain imidazolium group substituted with a non-curable group, and 0<p<1, the copolymer having formula (I),

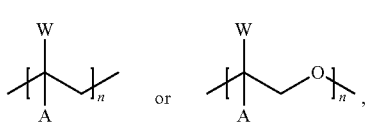

wherein:
A is H, alkyl or substituted alkyl;
n ranges from 2 to 100,000;
W is the side chain selected from the group consisting of:

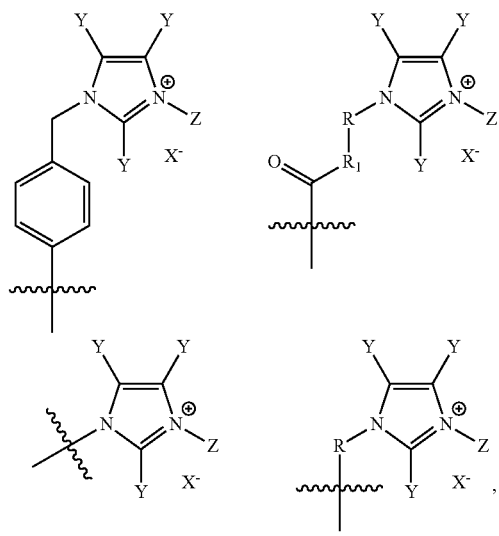

wherein in (II):
R is $C_1$-$C_6$ alkylene, $C_2$-$C_6$ alkenylene or $C_2$-$C_6$ alkynylene, wherein R is optionally substituted;
$R_1$ is NH or O;
each occurrence of Y is independently selected from the group consisting of H, alkyl, benzyl, phenyl, hydroxyl, nitro, halo, —$(CH_2CH_2O)_m$A and —$O(CH_2CH_2O)_m$A, wherein m is an integer ranging from 1 to 20, wherein each Y is independently optionally substituted;
$X^-$ is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, sulfonate, and any combinations thereof;
in (100×(1−p)) % of the monomeric units, Z is the curable group selected from the group comprising vinyl, 1,3-butadienyl, (1,3-butadienyl)-($C_1$-$C_6$ alkylene), styrenyl, $CH_2$=C(A)C(=O)R; (oxiran-2-yl)-R; and any combinations thereof; and
in (100×p) % of the monomeric units, Z is the non-curable group selected from the group consisting of H, alkyl, benzyl, phenyl, and oligo(ethylene glycol).

2. The composition of claim 1, wherein 0<p<0.8.

3. The composition of claim 1, wherein formula (I) is:

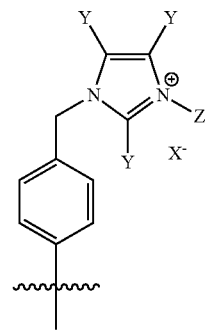

4. The composition of claim 1, wherein formula (II) is:

5. The composition of claim 1, wherein the composition is at least partially cured.

6. The composition of claim 1, further comprising at least one component selected from the group consisting of an imidazolium-functionalized RTIL, polymerization initiator, and imidazolium-based RTIL monomer.

7. The composition of claim 6, wherein at least 50 wt % of the RTIL-containing material in the composition corresponds to the imidazolium-functionalized RTIL.

8. The composition of claim 1, wherein the composition is embedded within a porous support membrane or deposited as a layer on the surface of a porous support membrane.

9. The composition of claim 8, wherein the composition is at least partially cured after being embedded within the porous support membrane or deposited as a layer on the surface of the porous support membrane.

10. A method of processing a given gas mixture comprising a first gas component and a second gas component, the method comprising:
(i) providing a membrane or film comprising at least one composition selected from the group consisting of:
(a) a composition comprising a curable imidazolium-functionalized poly(RTIL) copolymer comprising a plurality of imidazolium-functionalized monomeric units, wherein (100×(1−p))% of the monomeric units comprise a side-chain imidazolium group substituted with a curable group, (100×p) % of the monomeric units comprise a side-chain imidazolium group substituted with a non-curable group, and 0<p<1,
the copolymer having formula (I), wherein:
A is H, alkyl or substituted alkyl;
n ranges from 2 to 100,000;
W is the side chain selected from the group consisting of:

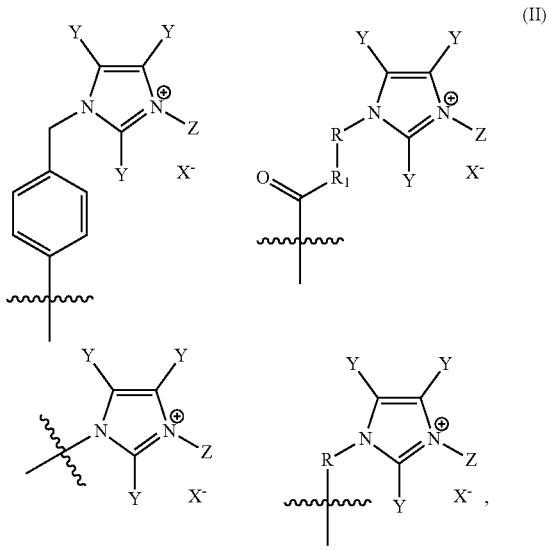

(II)

wherein in (II):
R is $C_1$-$C_6$ alkylene, $C_2$-$C_6$ alkenylene or $C_2$-$C_6$ alkynylene, wherein R is optionally substituted;
$R_1$ is NH or O;
each occurrence of Y is independently selected from the group consisting of H, alkyl, benzyl, phenyl, hydroxyl, nitro, halo, —$(CH_2CH_2O)_m$A and —$O(CH_2CH_2O)_m$A, wherein m is an integer ranging from 1 to 20, wherein each Y is independently optionally substituted;
$X^-$ is an anion selected from the group consisting of $Tf_2N^-$, $BF_4^-$, $N(CN)_2^-$, $PF_6^-$, $C(CN)_3^-$, $B(CN)_4^-$, $N(SO_2F)_2^-$, $TfO^-$, $SbF_6^-$, halide, sulfonate, and any combinations thereof;
in (100×(1−p)) % of the monomeric units, Z is the curable group selected from the group comprising vinyl, 1,3-butadienyl, (1,3-butadienyl)-($C_1$-$C_6$ alkylene), styrenyl, $CH_2$=C(A)C(=O)R; (oxiran-2-yl)-R; and any combinations thereof; and
in (100×p) % of the monomeric units, Z is the non-curable group selected from the group consisting of H, alkyl, benzyl, phenyl, and oligo (ethylene glycol); and,
(b) a composition comprising a RTIL, a step-growth imidazolium-based RTIL monomer and an amine-containing monomer;
wherein the step-growth imidazolium-based RTIL monomer comprises a compound of formula (IV):

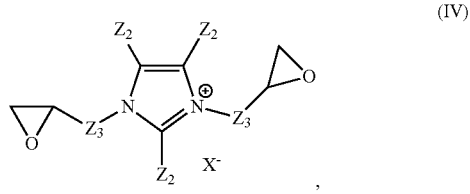

(IV)

wherein $X^-$ is an anion; each occurrence of $Z_3$ is independently $C_1$-$C_{20}$ alkylene, wherein one or more methylene groups are optionally replaced with —O—; and each occurrence of $Z_2$ is independently selected from the group consisting of H, alkyl, alkenyl, alkynyl, and aryl groups having 1 to 20 carbon atoms,
wherein the at least one composition is at least partially cured,
further wherein the membrane or film comprises a feed side and a permeate side, and is selectively permeable to the first gas component over the second gas component;
(ii) contacting the given gas mixture with the feed side of the membrane or film; and
(iii) applying a pressure difference across the membrane or film;
whereby the gas mixture isolated at the permeate side of the membrane or film is enriched for the first gas component over the second gas component as compared to the given gas mixture.

11. The method of claim 10, wherein the first gas component comprises carbon dioxide ($CO_2$) and the second gas component comprises methane ($CH_4$), hydrogen ($H_2$), or nitrogen gas ($N_2$).

12. The method of claim 10, wherein providing the membrane or film comprises embedding the composition within the pores of a solid porous support and optionally curing the composition at least partially.

13. The method of claim 10, wherein the membrane or film forms a layer on the surface of a solid porous support.

14. A composition comprising a RTIL, a step-growth imidazolium-based RTIL monomer and an amine-containing monomer, wherein the step-growth imidazolium-based RTIL monomer comprises a compound of formula (IV):

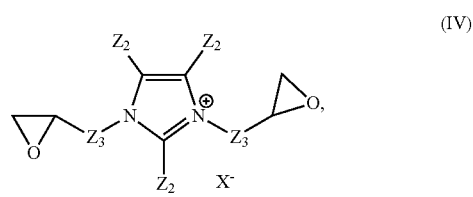

(IV)

wherein $X^-$ is an anion; each occurrence of $Z_3$ is independently $C_1$-$C_{20}$ alkylene, wherein one or more methylene groups are optionally replaced with —O—; and each occurrence of $Z_2$ is independently selected from the group consisting of H, alkyl, alkenyl, alkynyl, and aryl groups having 1 to 20 carbon atoms.

15. The composition of claim 14, wherein the composition is at least partially cured, whereby at least a portion of the step-growth imidazolium-based RTIL monomer reacts with the amine-containing monomer.

16. The composition of claim 14, wherein the composition comprises about 75 wt % or less of the RTIL.

17. The composition of claim 14, wherein the composition is embedded within a porous support membrane or deposited as a layer on the surface of a porous support membrane.

18. The composition of claim 17, wherein the composition is at least partially cured after being embedded within the porous support membrane or deposited as a layer on the surface of the porous support membrane.

* * * * *